United States Patent [19]

Ito et al.

[11] Patent Number: 5,086,452
[45] Date of Patent: Feb. 4, 1992

[54] RADIO TELEPHONE SYSTEM AND ITS CONTROL METHOD

[75] Inventors: Koichi Ito, Tokyo; Masanori Toba, Nagano, both of Japan

[73] Assignee: Kabushiki Kaisha Toshiba, Kawasaki, Japan

[21] Appl. No.: 363,974

[22] Filed: Jun. 9, 1989

[30] Foreign Application Priority Data

Jun. 13, 1988 [JP] Japan .................. 63-145499

[51] Int. Cl.⁵ .................................. H04Q 7/04
[52] U.S. Cl. .......................... 379/58; 379/61; 379/424
[58] Field of Search ............ 579/58, 61, 63, 424

[56] References Cited

U.S. PATENT DOCUMENTS

| | | | |
|---|---|---|---|
| 4,511,761 | 4/1985 | Yamazaki et al. | 379/61 |
| 4,634,810 | 1/1987 | Grassl et al. | 379/61 |
| 4,640,987 | 2/1987 | Tsukada et al. | 379/62 |
| 4,656,653 | 4/1987 | Oda et al. | 379/61 |
| 4,689,812 | 8/1987 | Hata | 379/62 |
| 4,694,485 | 9/1987 | Iwase | 379/62 |
| 4,752,949 | 6/1988 | Steinbeck et al. | 379/61 |
| 4,768,219 | 8/1988 | Yamagata et al. | 379/63 X |
| 4,847,900 | 7/1989 | Wakim | 379/424 |
| 4,856,083 | 8/1989 | Makino | 379/61 X |
| 4,870,696 | 9/1989 | Yorita | 379/61 X |

FOREIGN PATENT DOCUMENTS

| | | | |
|---|---|---|---|
| 0027188 | 4/1981 | European Pat. Off. | 379/424 |
| 3513698 | 10/1986 | Fed. Rep. of Germany | 379/424 |
| 2487610 | 1/1982 | France | 379/424 |

*Primary Examiner*—James L. Dwyer
*Assistant Examiner*—M. Shehata
*Attorney, Agent, or Firm*—Finnegan, Henderson, Farabow, Garrett and Dunner

[57] ABSTRACT

A mobile unit is normally disposed in a predetermined positional relationship with a base unit connected to a wired line. For example, the mobile unit is mounted on the mobile-unit receiving part of the base unit. If the predetermined positional relationship is changed, it is detected by means of a detector such as a electrical, mechanical, or optical detector. In response to the detection of a change in the predetermined positional relationship, a radio link may be established between the base unit and the mobile unit or a communication link may be established between the mobile unit and a calling party. Furthermore, in response to the detection of the change, the mobile unit or the base unit may be partly or entirely powered so as to establish the radio link or the communication link. When the mobile unit is reset to a position in the predetermined positional relationship, it is detected by the detector. Responsive to the detection of the reset of the mobile unit, the established radio or communication link may be disconnected while the mobile unit or the base unit may be partly or entirely powered off.

5 Claims, 22 Drawing Sheets

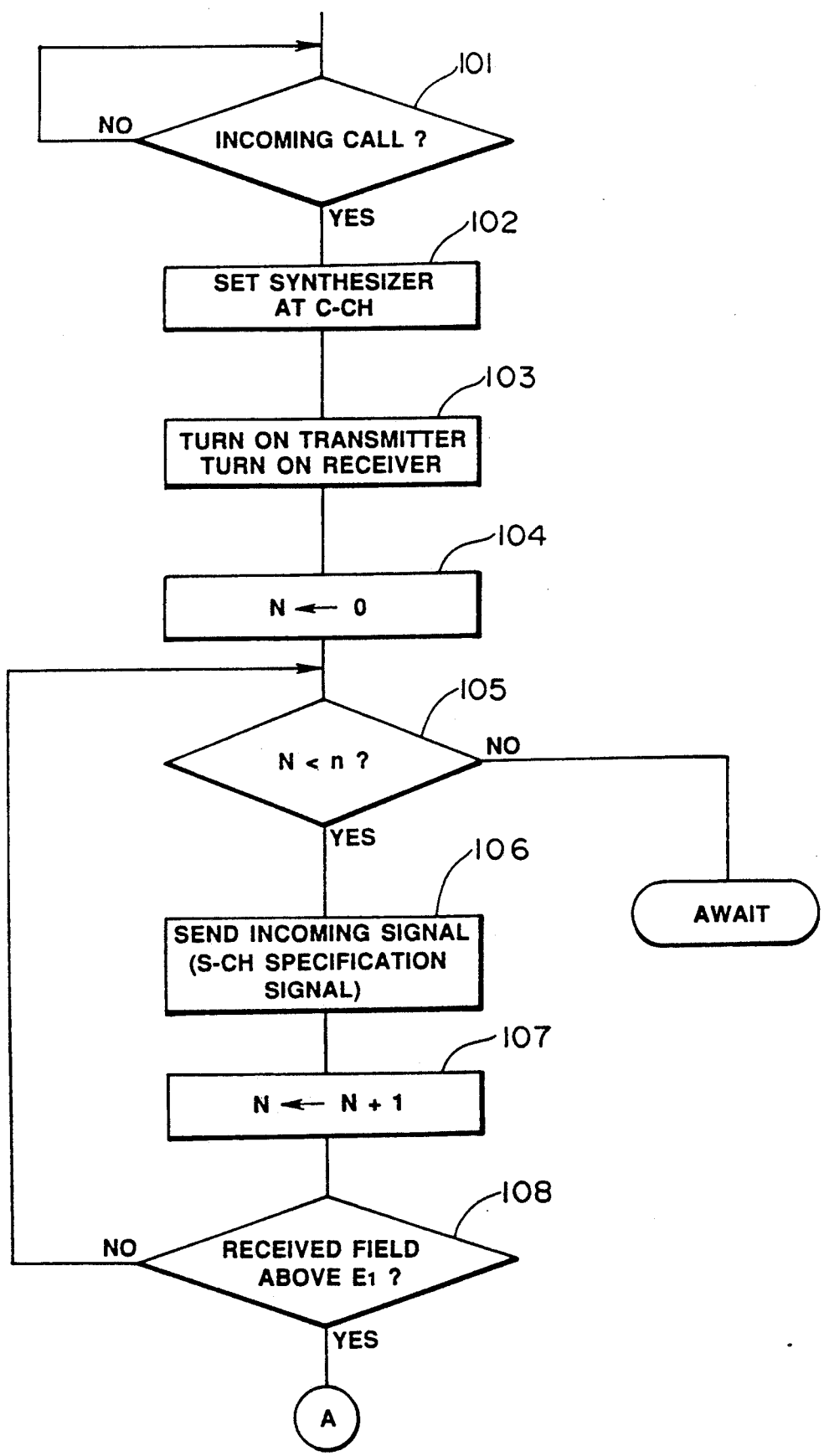
FIG. 3 (PART I)

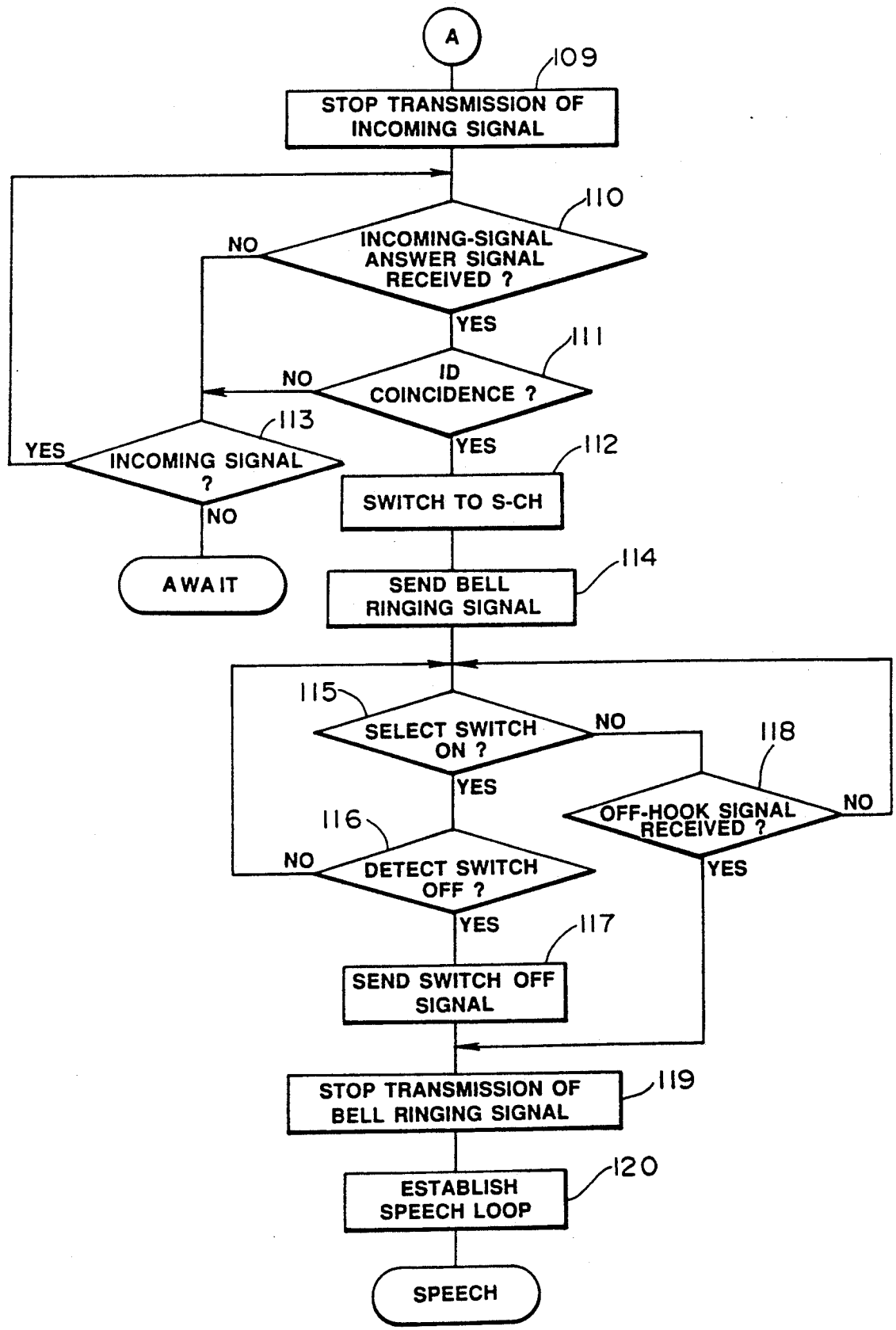
FIG. 3 (PART II)

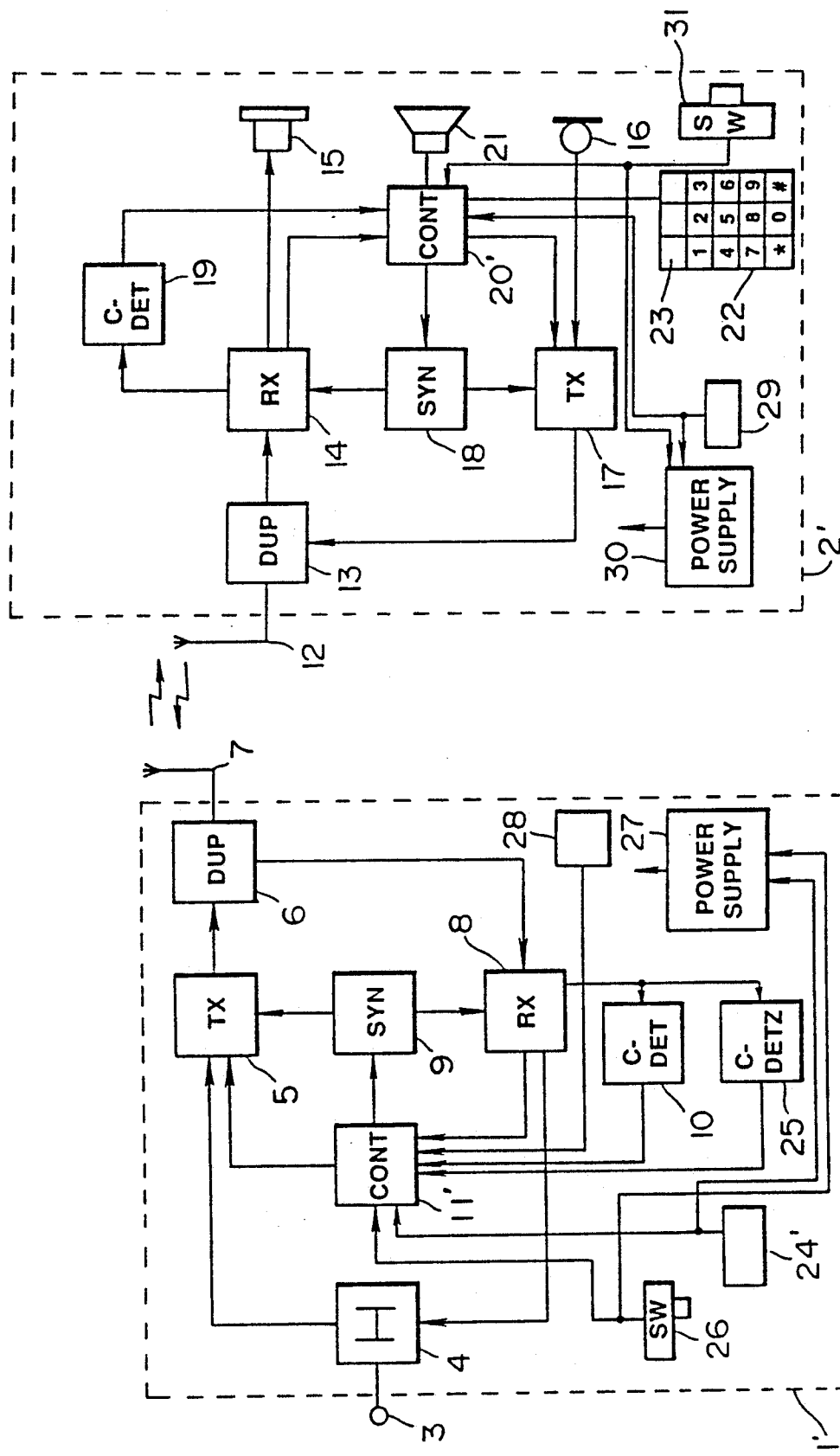

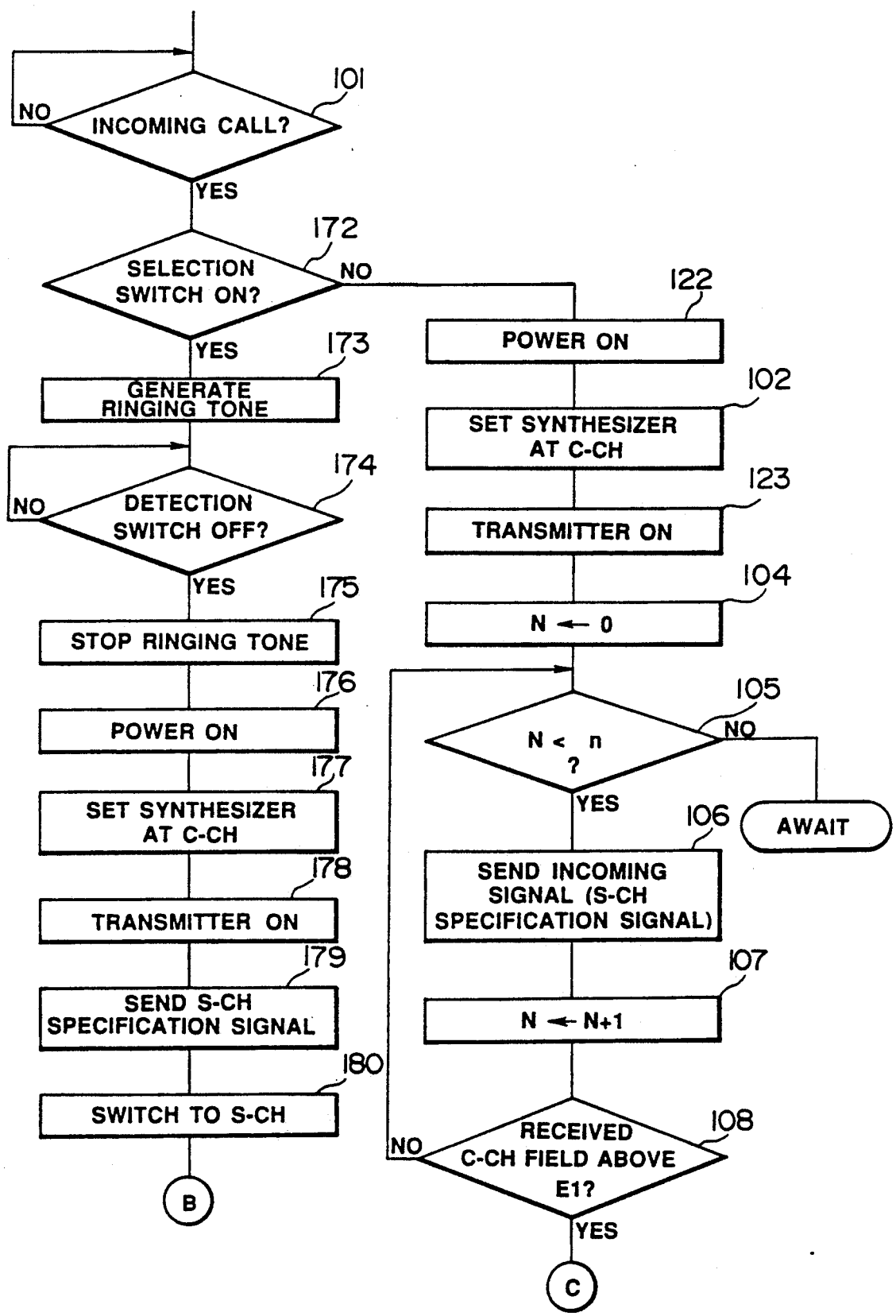
FIG.14 (PART I)

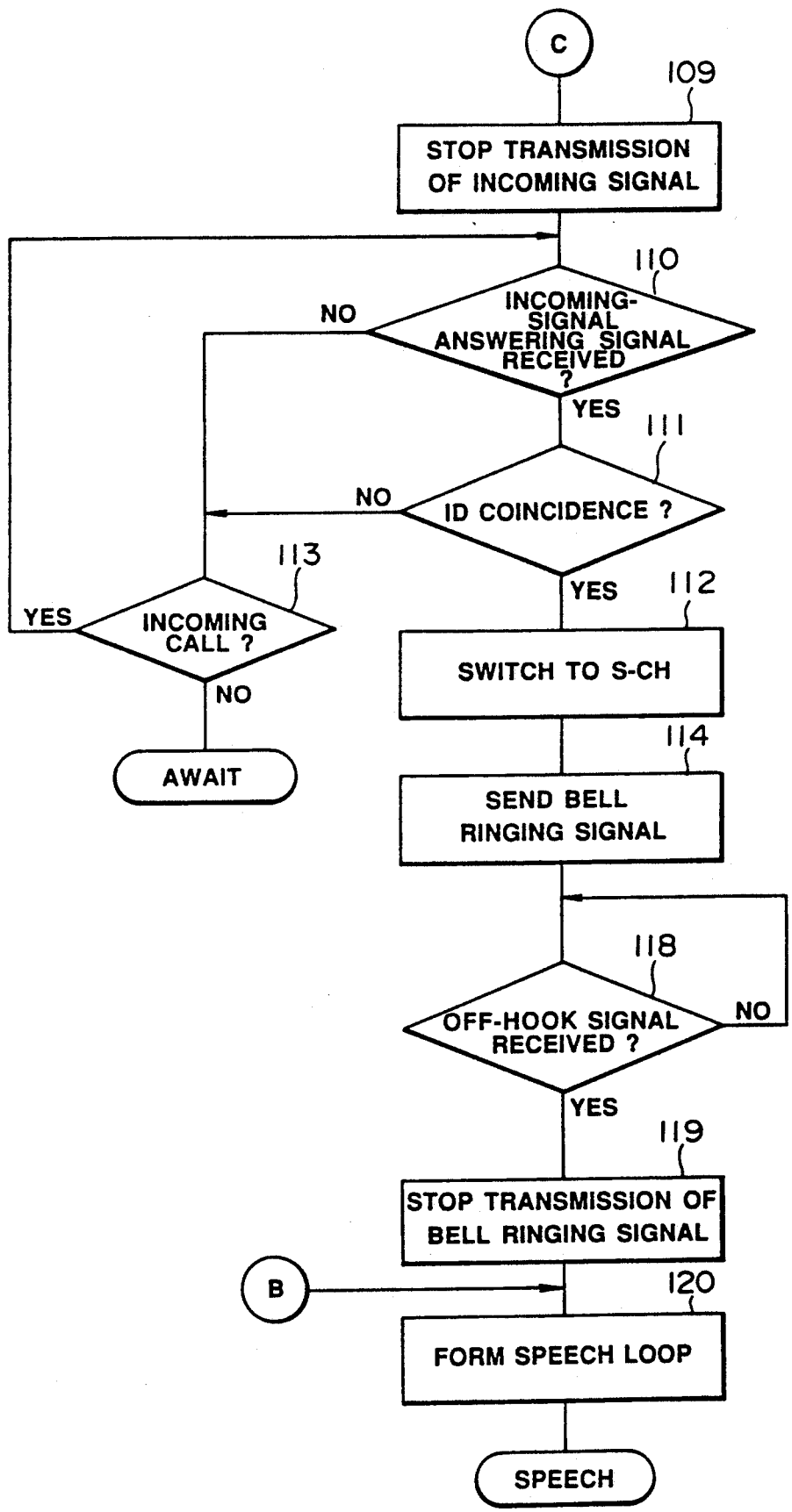
FIG. 14 (PART II)

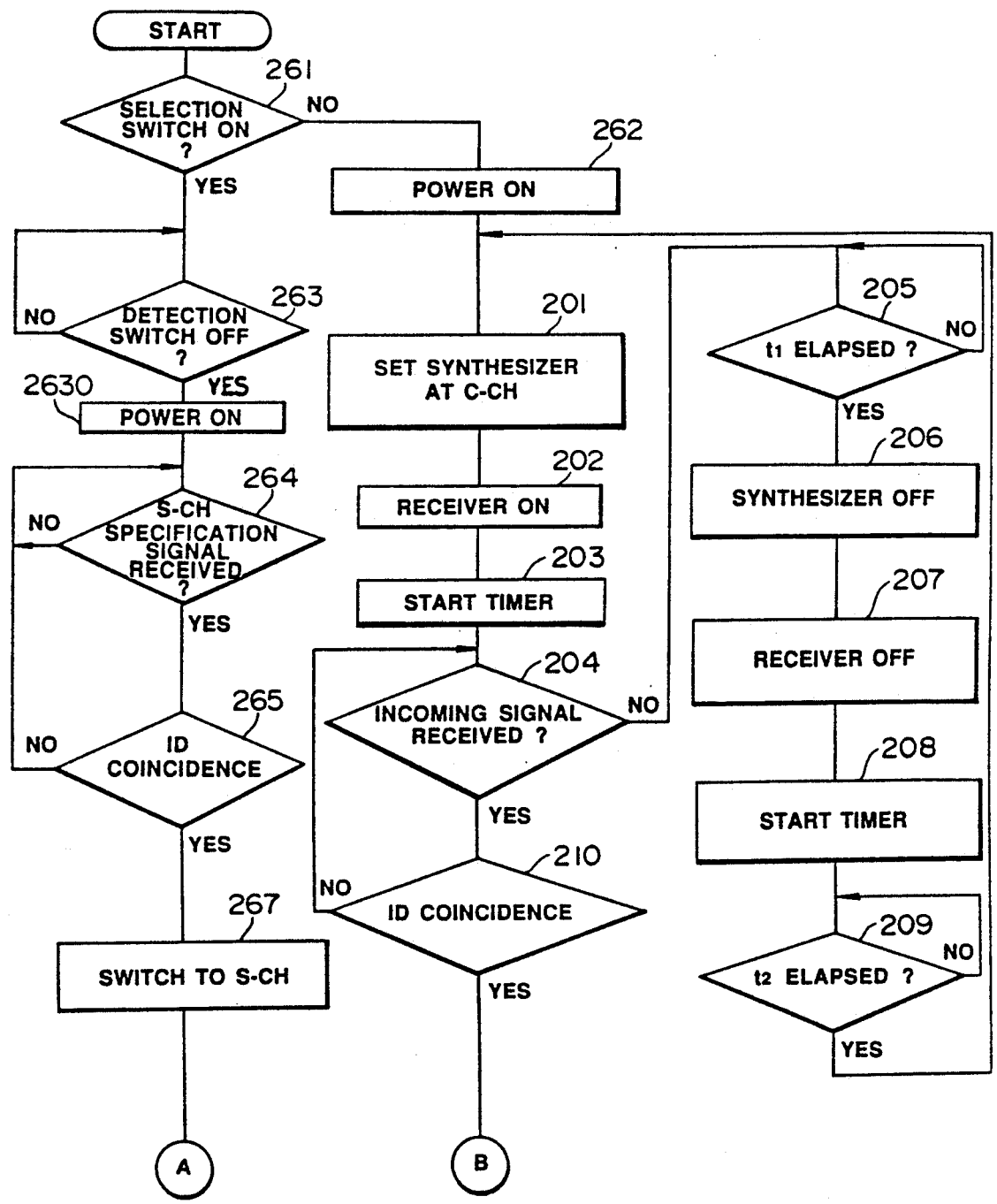
FIG.15(PART I)

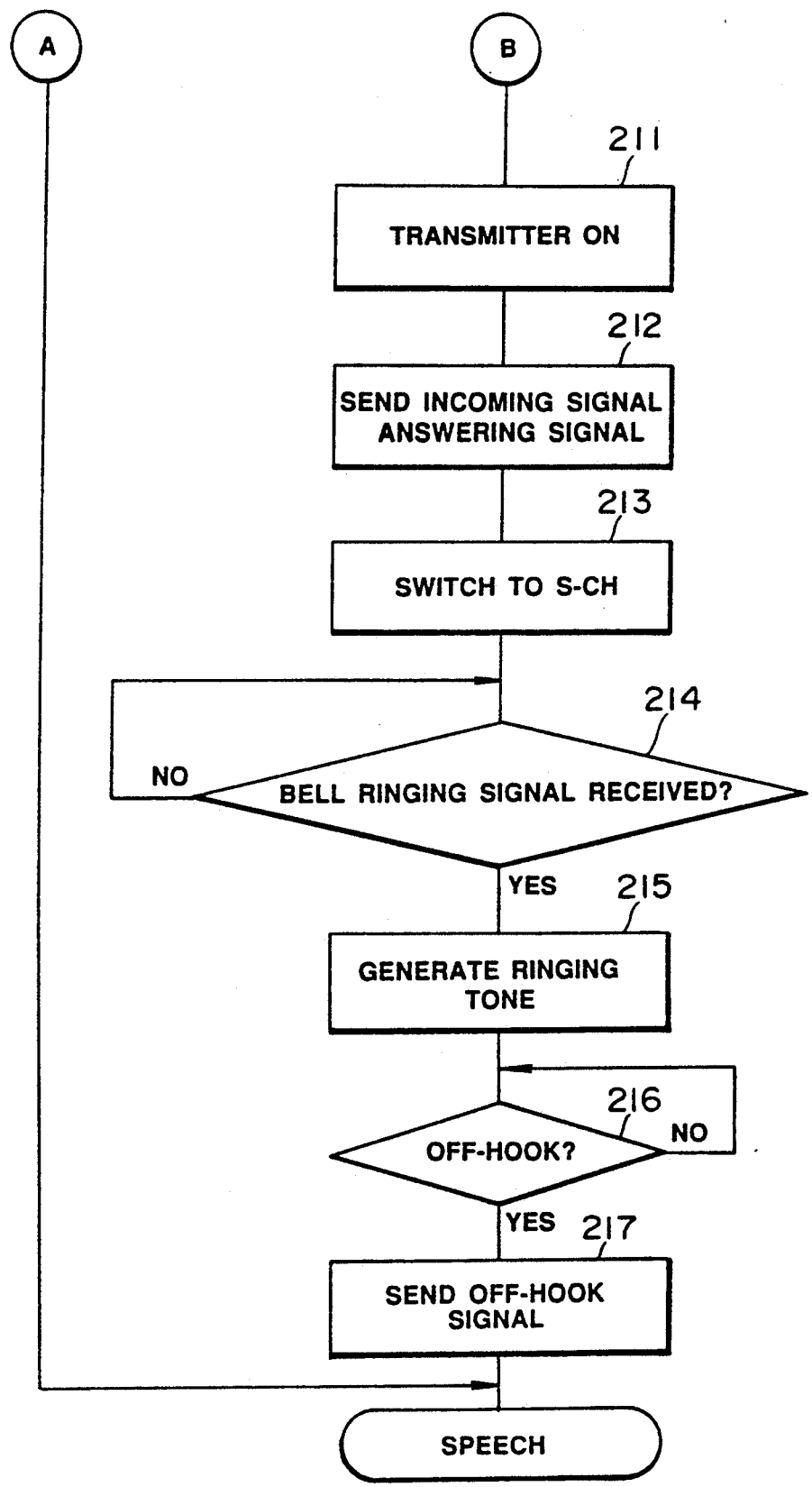
FIG.15 (PART II)

RADIO TELEPHONE SYSTEM AND ITS CONTROL METHOD

BACKGROUND OF THE INVENTION

1. Field of the Invention

The present invention relates to radio telephone systems and their control methods of multi-channel access type which detect an idle one of a plurality of radio channels and send or receive a voice or datum signal through the idle channel and, more particularly, to a cordless telephone system and its control method wherein a mobile unit is normally disposed in a predetermined positional relationship with a base unit connected to a wired line.

2. Description of the Related Art

A prior art cordless telephone system is arranged so that, when an incoming call arrives at a cordless telephone, a user can talk with the party by operating a hook switch provided within the dial unit of the radio telephone set. Accordingly, if there is an incoming call at the radio telephone set mounted on the telephone-set receiving part of the base unit, then the user must first pick up the readio telephone set from the set receiving part of the base unit and then operate the hook switch of the telephone set. This radio telephone set, when compared with an ordinary home telephone set through which the user can talk with the party only by lifting the handset of the telephone set, is very troublesome in handling. The same explanation also holds true when the user wishes to end the conversation. This leads to the fact that, when the user frequently uses the telephone, such handling becomes highly inconvenient.

Another problem of the prior art cordless telephone system is that the mobile unit must be continuously or intermittently powered by a battery to detect a control signal transmitted from the base unit in response to the arrival of an incoming call. Similarly, the base unit must be powered by a battery or a commercial power source to detect a control signal transmitted from the mobile unit in response to a user's operation for a call origination. Thus, power is consumed so much to monitor the control signals. Especially, the consumption of battery power is a more serious problem to the mobile unit because it has only a limited power capacity.

SUMMARY OF THE INVENTION

It is accordingly an object of the present invention to provide a radio telephone system wherein a mobile unit is disposed in a predetermined positional relationship with a base unit and the operability for users is greatly improved.

It is a further object of the present invention to provide an improved radio telephone system having at least a base unit connected to a wired line and a mobile unit normally disposed in a predetermined positional relationship with the base unit, wherein a user may respond to an incoming call or originate a call by changing the predetermined positional relationship.

It is still a further object of the present invention to provide an improved radio telephone system having at least a base unit connected to a wired line and a mobile unit normally disposed in a predetermined positional relationship with the base unit, wherein power consumption is greatly conserved.

It is still a further object of the present invention to provide a radio telephone system which allows only operator's picking-up operation of the radio telephone set from the telephone-set receiving part of the base unit to put the telephone set in its speech mode, and which allows only his replacing operation of the telephone set on the set receiving part of the base unit to put the telephone set in its speed-end mode.

According to the present invention, a mobile unit is normally disposed in a predetermined positional relationship with a base unit connected to a wired line. For example, the mobile unit is mounted on the mobile-unit receiving part of the base unit. If the predetermined positional relationship is changed, it is detected by means of a detector such as an electrical, mechanical, or optical detector. In response to the detection of a change in the predetermined positional relationship, a radio link may be established between the base unit and the mobile unit or a communication link may be established between the mobile unit and a calling party.

Furthermore, in response to the detection of the change, the mobile unit or the base unit may be partly or entirely powered so as to establish the radio link or the communication line. When the mobile unit is reset to a position in the predetermined positional relationship, it is detected by the detector. Responsive to the detection of the reset of the mobile unit, the established radio or communication link may be disconnected while the mobile unit or the base unit may be partly or entirely powered off.

More specifically, in accordance with an aspect of the present invention, a detection switch is provided for detecting a state in which a radio telephone set is mounted on the telephone-set receiving part of a base unit so that the base unit uses a detection signal of the detection switch in place of on-hook/off hook signals of the radio telephone set for controlling the connection and disconnection of a spatial radio communication circuit. Accordingly, a user may initiate a call origination only by lifting the radio telephone set without operating the hook switch.

When an incoming call arrives at the radio telephone set placed on the telephone-set receiving part of the base unit, operator's lifting operation of the radio telephone set in answer to it causes the detection switch to detect it. The base unit judges, on the basis of a detection output received from the detection switch, that an off-hook operation has been done, and shifts its operation to an incoming-call operation. Thereby, a communication link is established between the radio telephone set and a calling party. Accordingly, a user may respond to the incoming call only by lifting the radio telephone set without operating the hook switch.

When the operator wishes to terminate his speech, on the other hand, his mounting of the radio telephone set on the telephone-set receiving part of the base unit causes the base unit to judge the generation of an off-hook operation and thus to shift its operation to a line disconnecting operation.

In this way, in accordance with the aspect of the present invention, since the detection switch is provided for detecting whether or not the radio telephone set is mounted on the base unit and the detection output of the detection switch is used in place of the on-hook/off-hook signal, an incoming call and a speech-end require only operator's lifting (picking-up) and mounting (replacing) operations of the radio telephone set from and on the telephone receiving part of the base unit, thereby improving its handling ease. In addition, when the system is provided with a unique calling function of calling from the base unit to the radio telephone set, the system can easily call the user by the radio telephone set located at a long distance from the base unit.

Still, in accordance with another aspect of the present invention, when a radio telephone set is mounted on a base unit, the radio telephone set may not be powered and the base unit is capable of being powered by a power supplied via a subscriber line and may not be necessarily powered by a battery or a commercial power source. If the radio telephone set is lifted from the base unit by a user, it is detected by a detector arranged in the radio telephone set and/or the base unit. Responsive to the detection, the radio telephone set is powered by a battery to establish a radio link with the base unit while the base unit is also powered by a battery or a commercial power source entirely to establish a radio link with the radio telephone set. When the radio telephone set is remounted on the base unit, the radio telephone set is powered off. Also, the base unit may be powered off while remaining capable of being powered via the subscriber line for ringing. Thus, power which would be consumed to monitor the control signals in the prior art system can be conserved.

BRIEF DESCRIPTION OF THE DRAWINGS

FIGS. 3 (Parts I and II) and 4 show flowcharts for explaining the operation of a base unit and the radio telephone set in a signal reception mode;

FIGS. 13(a and b) are block diagrams showing another embodiment of the present invention;

FIGS. 14 (Part I and II) are flowcharts of the operation of the base unit 1 in the call reception mode;

FIGS. 15 (Part I and II) are flowcharts of the operation of the radio telephone set 2 in the call reception mode;

DESCRIPTION OF THE PREFERRED EMBODIMENT

Figure 1:
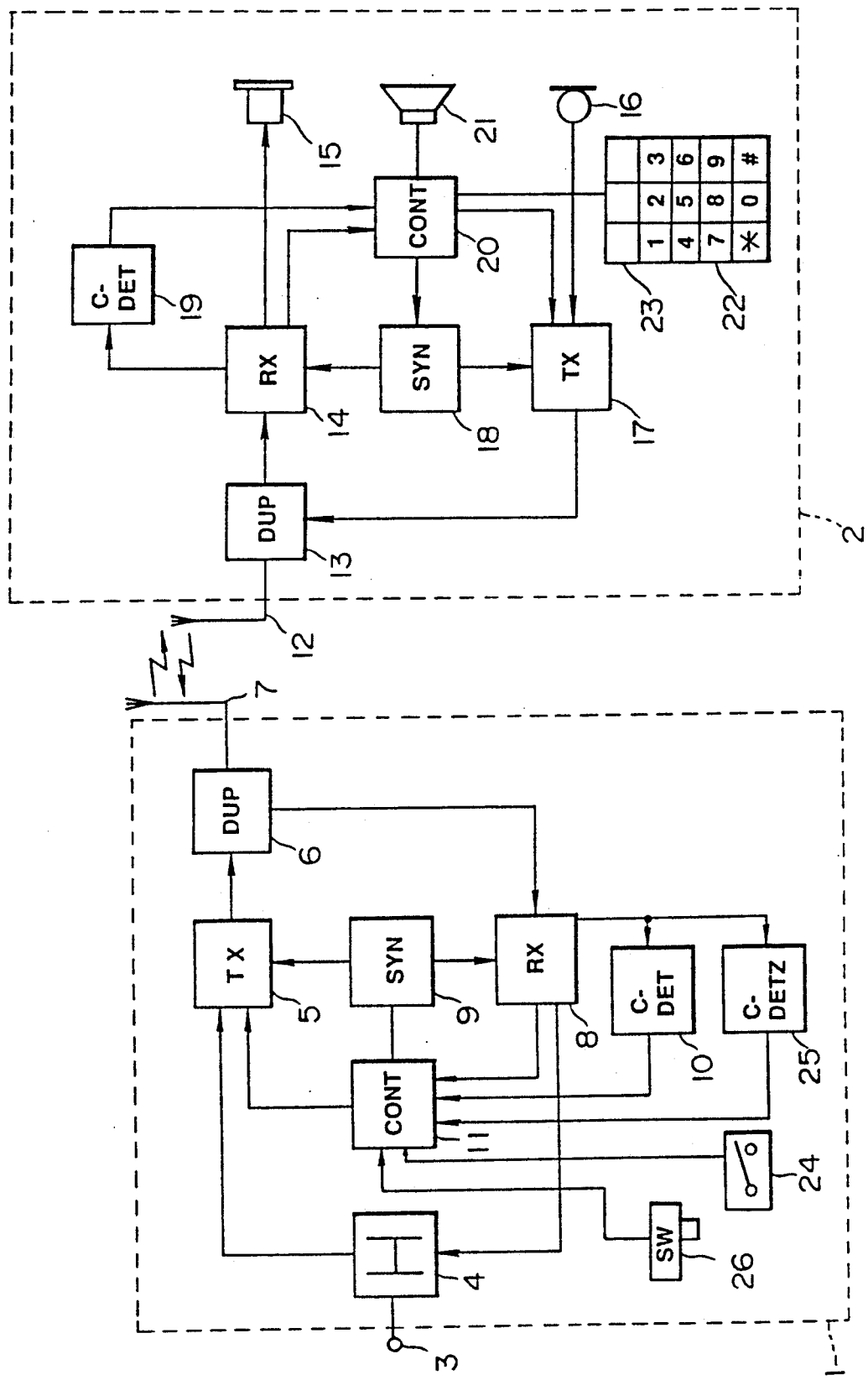
FIGS. 1(a) and 1(b) are block diagrams showing an embodiment of the present invention.

There is shown a block diagram of an embodiment of the present invention in FIG. 1, in which a base unit 1 is coupled through a spatial radio communication circuit with a radio telephone set 2 and also connected to a wired telephone line (subscriber line) 3.

An incoming signal from the wired telephone line 3 is sent through a hybrid circuit 4 to a transmitter 5 as its modulation input. Electromagnetic waves of the signal modulated in the transmitter 5 are sent through an antenna duplexer 6 to an antenna 7 to be transmitted therefrom to the radio telephone set 2.

Radio waves transmitted from the radio telephone set 2, on the other hand, are received at the antenna 7 from which the waves are further sent through the antenna duplexer 6 to a receiver 8 to be demodulated therein. The demodulated signal is transmitted from the receiver 8 through the hybrid circuit 4 to the wired telephone line 3.

A synthesizer 9 is provided to output signals corresponding to radio channels (speech channel and control channel) to the transmitter 5 and the receiver 8 respectively.

One of outputs of the receiver 8 is applied to a received-electric-field detecting circuit 10 to be used for judgement of the intensity of electric field. This circuit 10 is generally known as a carrier or noise squelch circuit. Another output of the receiver 8 is applied as a datum signal contained in the received demodulation waves to a control circuit 11 for collation of an identification signal determined by a combination of the base unit 1 and radio telephone set 2. The control circuit 11 receives the output of the detection circuit 10 and the datum signal of the received demodulation waves to control the synthesizer 9 for switching control of the radio channels. The controller 11 also sends a transmission-data signal as its modulation input to the transmitter 5.

Even in the radio telephone set 2, antenna 12, a receiver 14 and an antenna duplexer 13 are similarly provided. A demodulated output of the receiver 14 is applied to a telephone receiver 15. A voice signal received from a telephone transmitter 16, on the other hand, is applied to a transmitter 17 as its modulation input and further sent therefrom through the antenna duplexer 13 to the antenna 12, from which the signal is radiated in the form of electromagnetic waves.

A synthesizer 18, a received-electric-field-intensity detecting circuit 19 and a control circuit 20 are substantially the same as those in the base unit 1. The control circuit 20 functions to control the radio telephone set 2. A loudspeaker 21 is a sounder which emits a calling tone in the incoming call mode. A dial unit 22 is used for an operator to input data such as dial data to the control circuit 20 through the dial unit.

Figure 2:
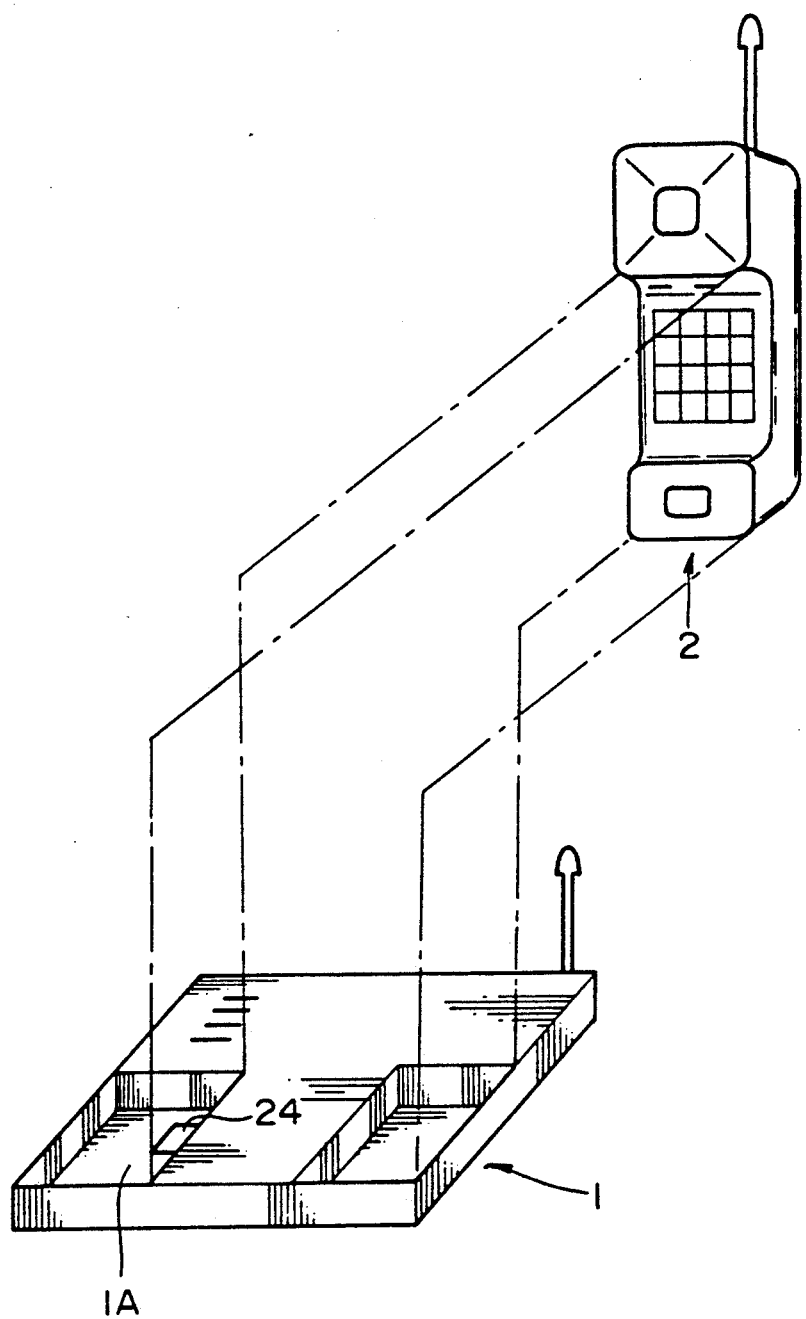
FIG. 2 is a perspective view of a radio telephone set used in the embodiment of FIG. 1.

The base unit 1 and the radio telephone set 2 has such an outside structure as shown in FIG. 2. The base unit 1 is provided with a telephone-set receiving part 1A in which the radio telephone set 2 is to be placed. Under such a condition that the radio telephone set 2 is to be placed in the telephone-set receiving part 1A, the radio telephone set 2 is electrically connected at its charging terminal to a charging terminal of the base unit 1 to charge a battery built in the radio telephone set 2.

In the illustrated embodiment, the base unit 1 includes a detection switch 24 which detects such a state that the radio telephone set 2 is mounted in the telephone-set receiving part 1A of the base unit 1 (refer to FIGS. 1 and 2), and also includes a selection switch 26 which determines whether or not the on-hook and off-hook operations are carried out by a hook switch 23 of the dial unit 22 or by the detection switch 24. The base unit 1 further includes an electric-field-intensity detecting circuit 25 which detects whether or not the radio telephone set 2 is located away from the base unit 1, the intensity of electric field for the received-electric-field detecting circuit 10 to be detected being different from that for the field detecting circuit 25. Detection outputs from these detection switch 24, field-intensity detector 25 and selection switch 26 are all applied to the control circuit 11.

With such an arrangement as mentioned above, the schematic control of the radio telephone system in the signal reception mode will be carried out as follows in accordance with a flowchart shown in FIGS. 3 and 4. FIG. 3 shows the operation of the base unit 1 in the signal reception mode, and FIG. 4 shows the operation of the radio telephone set 2 in the signal reception mode.

The base unit 1, as shown in FIG. 3, when detecting a ringing tone, i.e., an incoming call from the wired telephone line 3 in an await mode (step 101), causes the synthesizer 9 to set its oscillation frequency at the frequency of a control channel (C-CH) (step 102), thereafter the transmitter 5 is turned ON (step 103) and a transmission times N of the incoming signal is cleared to be zero (step 104). At this stage, since N is less than n (n being a preset constant) (step 105), the base unit 1 transmits the incoming signal (step 106) and the value N is added by 1 to be set to a new value which is equal to N=N+1 (step 107). The incoming signal contains an identification signal for its own identification (i.e., ID code) and a signal for specification of an ID code and a speech channel (S-CH).

Figure 4:
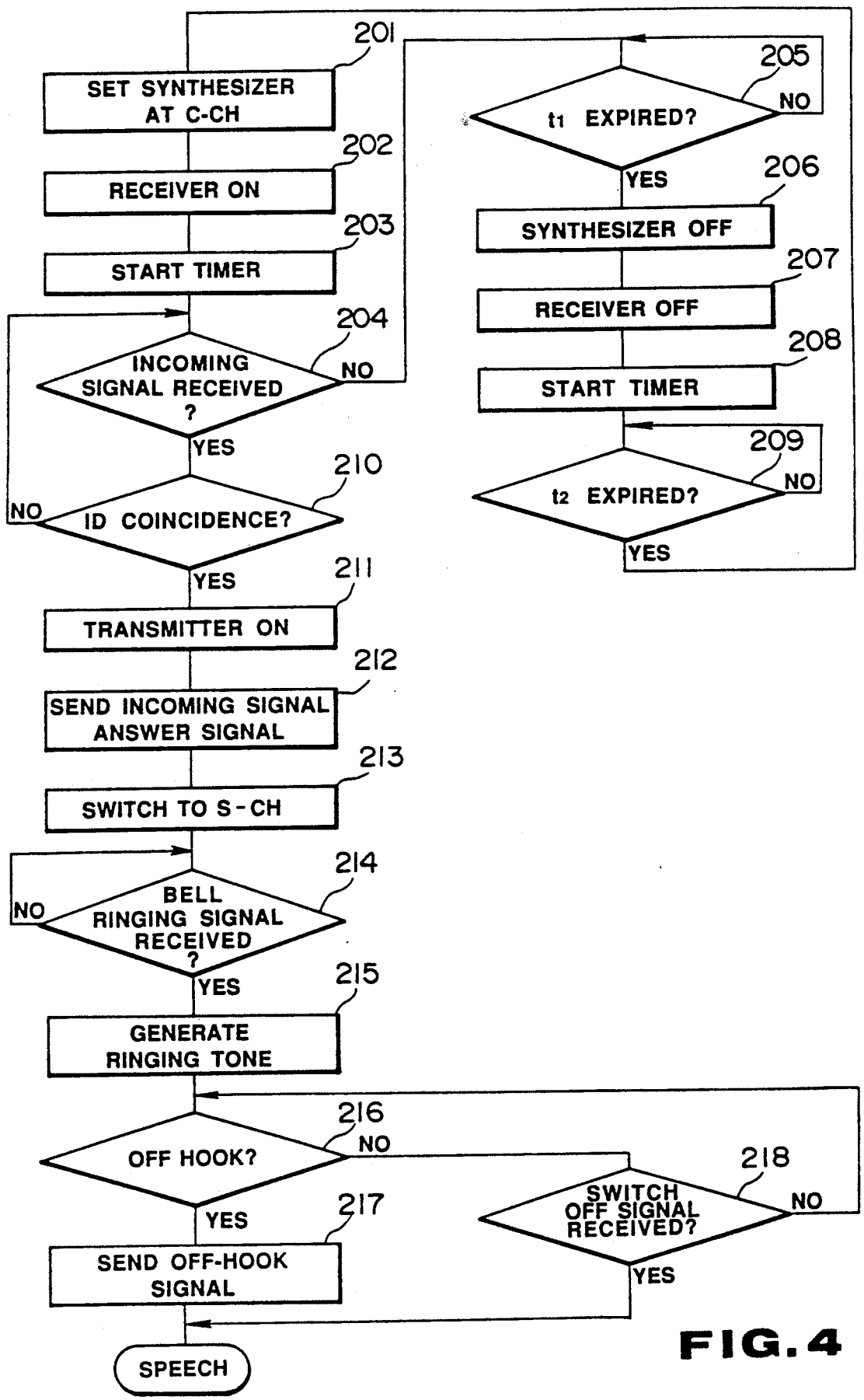

In the radio telephone set 2, on the other hand, as shown in FIG. 4, the synthesizer 18 and the receiver 14 is turned ON for a predetermined time of t1 in the await mode and then turned OFF for a predetermined time of t2 thereafter, which is repeated. That is, the radio telephone set 2 first turns ON the synthesizer 18 to set its oscillation frequency at the frequency of the control channel (C-CH) (step 201) and turns ON the receiver 14 (step 202), at which time a timer (not shown) is started (step 203). Under this condition, if the radio telephone set 2 receives the incoming signal from the base unit 1 (step 204), then it checks whether or not its own ID signal coincides with that of the incoming signal (step 210). When the radio telephone set 2 determines the coincidence of the ID signal, the telephone set 2 turns ON the transmitter 17 (step 211) to send an incoming-signal answering signal (step 212) and switch then the channel to the specified speech schannel (S-CH) (step 213). The incoming-signal answering signal includes an ID code for its own identification.

When the radio telephone set 2 receives no incoming signal, that is, when the time t1 elapses without reception of any incoming signal after the synthesizer 18 is set at the frequency of the control channel (step 205), the telephone set 2 turns OFF the synthesizer 18 for the time t2 (step 206) and turns OFFs the receiver 14 (step 207). Subsequently, the telephone set 2 starts the timer (step 208). After the time t2 elapses (step 209), control is returned to the step 201 to repeat the above operation. The turning-ON and -OFF operation of the receiver 14 for intermittent signal reception is called battery saving.

The base unit 1, as shown in FIG. 3, when detecting at the received-field-intensity detector 10 electromagnetic waves from the radio telephone set 2, that is, when the electric field received at the field detector 10 exceeds a level E1 (step 108), stops the transmission of the incoming signal (step 109).

That is, when the base unit 1 fails to detect radio waves from the radio telephone set 2, i.e., when the received field at the field receiver 10 does not reach the level E1, the base unit 1 determines that the incoming signal has not been received at the radio telephone set 2 and repeats the transmission of the incoming signal up to a predetermined number of times n (steps 105, 106, 107 and 108). As soon as a relation N<n is not satisfied at the step 105, the base unit 1 returns to its await mode. The transmission of the incoming signal up to the predetermined number of times is due to the intermittent reception of the incoming signal at the radio telephone set 2 which cannot receive the signal for the time period t2. And the abortion of the transmission at the last n time is due to the avoidance of useless occupation of the control channel as when the radio telephone set 2 is turned OFF or located too away from the base unit.

When the base unit receives the incoming signal answering signal (step 110) and finds a coincidence in the identification signal (ID code) contained in the answering signal (step 111), the base unit switches the current channel to the speech channel (S-CH) specified by the above incoming signal (step 112). A non-coincidence in the ID code, which means a response from the other radio telephone sets, causes the base unit to wait until the call from the wired telephone line 3 ceases (step 113), after which the base unit returns to the await mode. After the base unit 1 switches its channel to the speech channel (S-CH), it transmits a bell ringing signal (step 114).

As shown in FIG. 4, the radio telephone set 2, when receiving this bell ringing signal (step 213), causes the loudspeaker 21 to emit a ringing tone (step 214). In answer to it, if the user turns ON the hook switch (speech button switch) 23 provided on the dial unit 22 for the off-hook operation (step 215), then the radio telephone set 2 sends an off-hook signal (step 216), whereby the telephone set is put in its speech mode.

As shown in FIG. 3, if the selection switch 26 is in its OFF state (step 115) and the base unit 1 receives the off-hook signal from the radio telephone set 2 (step 118), then the base unit stops the transmission of the bell ringing signal (step 119) and establishes a speech loop with the wired telephone line 3 (step 120), thus putting the system in the speech mode.

In the case where the radio telephone set 2 is mounted on the telephone-set receiving part 1A of the base unit 1 and the selection switch 26 is set at a mode in which its hook-operation is made by the detection switch 24 (step 115), if an incoming signal appears on the wired telephone line 3, radio link between the base unit 1 and the radio telephone set 2 is established as mentioned above (steps 101 to 114). Responsive to the bell ringing signal, the bell rings at the radio telephone set 2. If the user picks up the radio telephone set 2 from the telephone-set receiving part 1A, this causes the detection switch 24 to be turned OFF (put in its non-detection state) (step 116). At this time, the control circuit 11 judges that an off-hook operation has been given on the basis of a signal indicative of this non-detection state received from the detection switch 24, sends out a switch off signal (step 117), stops the transmission of the bell ringing signal (step 119) and establishes a speech loop (step 120), putting the base unit 1 in the speech mode.

The radio telephone set 2, when receiving this switch off signal (step 217), is put in the speech mode.

In the foregoing embodiment, explanation has been made as to only the arrangement that the sounder 21 of the radio telephone set 2 generates the ringing tone. The embodiment, however, is also arranged so that, when the power switch of the radio telephone set 2 is not turned ON, the base unit 1 can generate the ringing tone.

When the selection switch 26 is set at its hook operation side by the hook switch 23, the control circuit 11 will not send the above switch off signal even in the non-detection state of the detection switch 24 and thus the base unit will not be shifted immediately to the incoming-call mode. In this case, the base unit is shifted to the incoming-call mode at the time point when the hook switch 23 is operated.

Accordingly, so long as the selection switch 26 is set at the hook operation side by the detection switch 24, only user's lifting of the radio telephone set from the telephone-set receiving part 1A enables the system to be put in the speech mode, as in the case of the ordinary telephone set.

Figure 7:
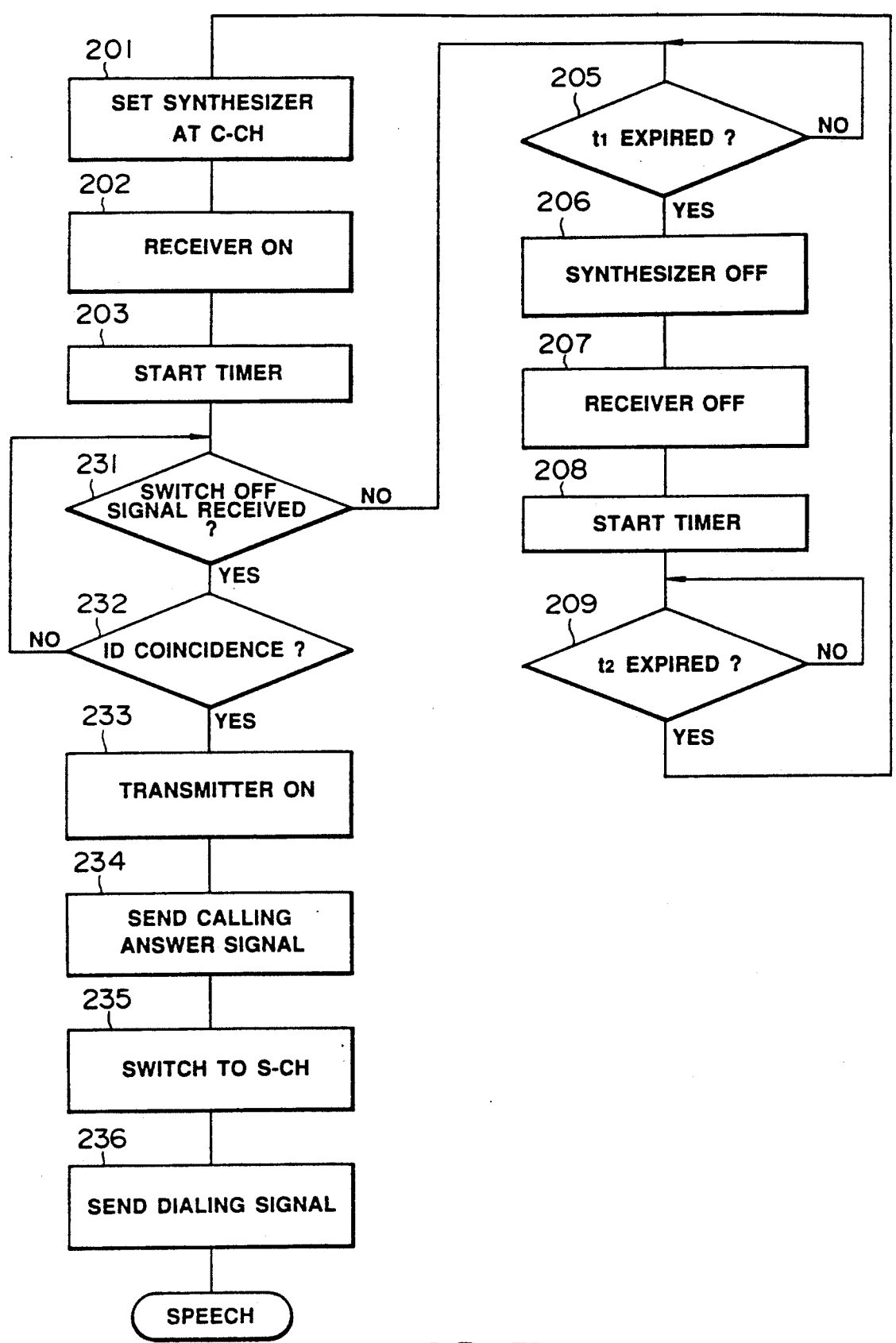
FIGS. 7 and 8 show flowcharts for explaining the operation of the radio telephone set and base unit in the calling mode when the selection switch is set at its hook operation side by a detection switch.
Figure 8:
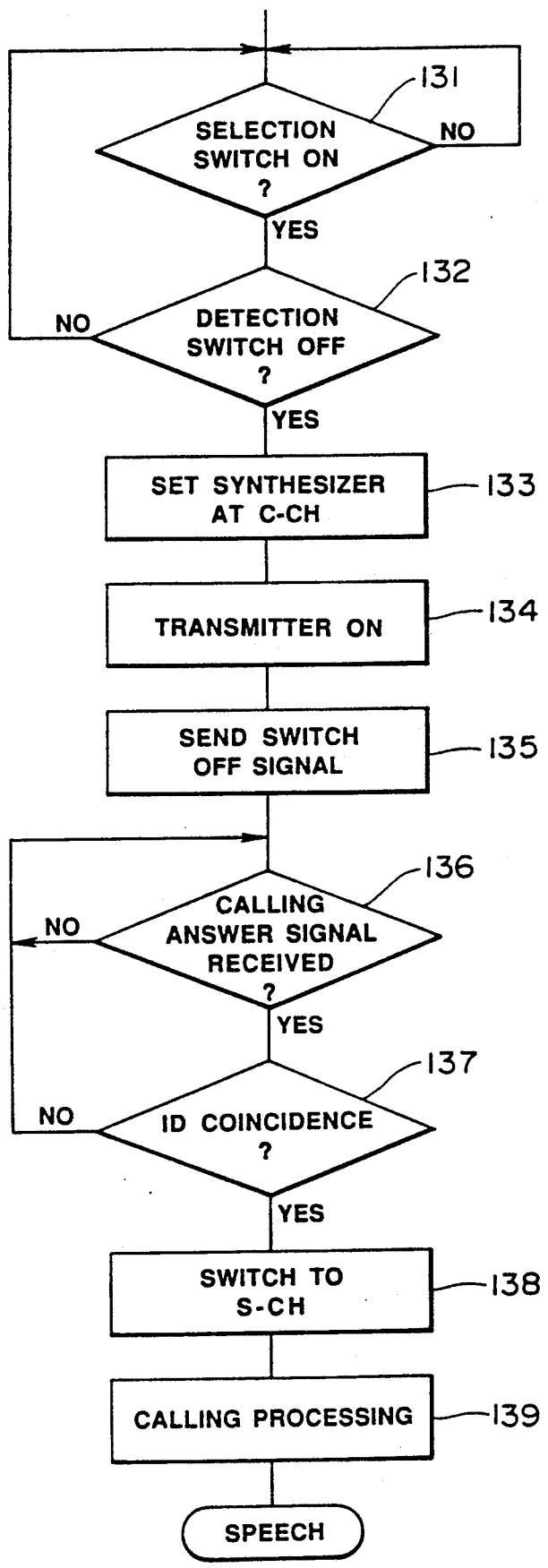

The operation of the system when a call is issued from the side of the radio telephone set 2 will next be explained in accordance with flowcharts of FIGS. 5 to 8. More specifically, FIGS. 5 and 6 show a flowchart for explaining the operation of the radio telephone set 2 and base unit 1 when the selection switch 26 is set at the hook operation side by the hook switch 23, while FIGS. 7 and 8 show a flowchart for explaining the operation of the radio telephone set 2 and base unit 1 when the selection switch 26 is set at the hook operation side by the detection switch 24.

Figure 5:
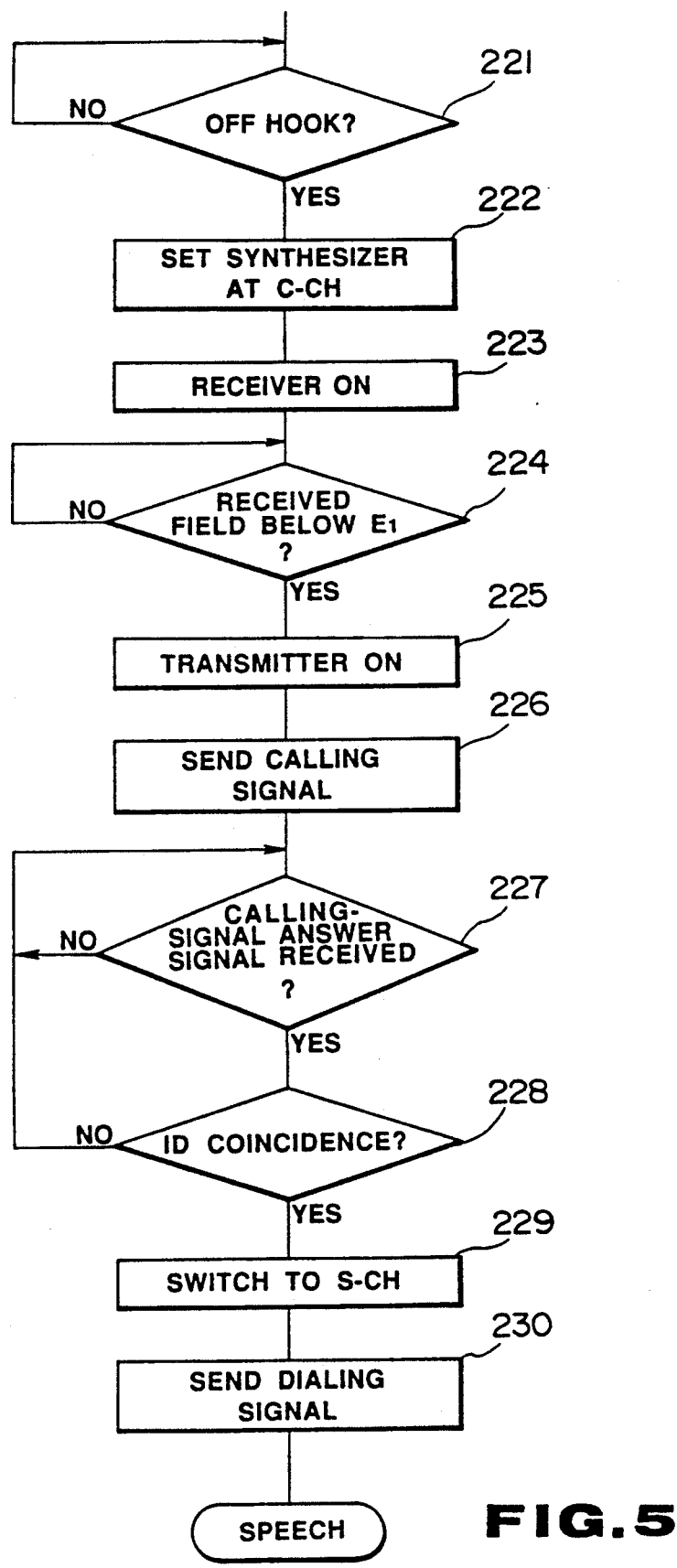
FIGS. 5 and 6 show flowcharts for explaining the operation of the radio telephone set and base unit in a calling mode when a selection switch is set at its hook operation side by a hook switch.
Figure 6:
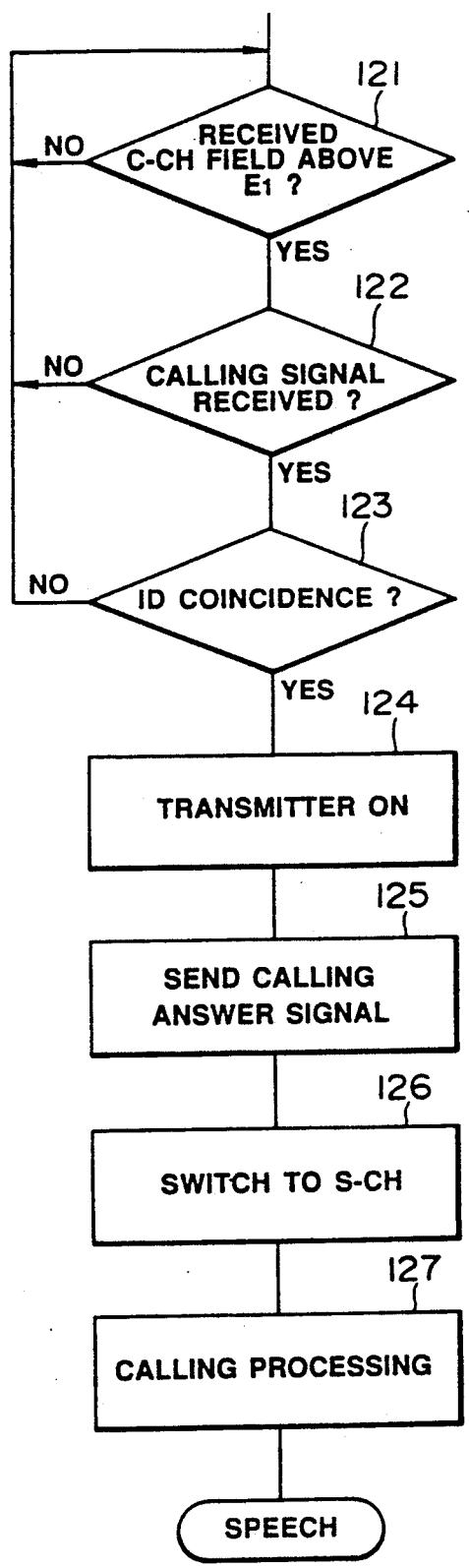

In FIGS. 5 and 6, when the hook switch 23 is turned ON for the purpose of sending an outgoing call onto the wired telephone line 3 from the side of the radio telephone set 2 (step 221), the control circuit 20 judges on the basis of the turned ON switch 23 that the radio telephone set should be shifted to its calling mode. To this end, under control of the control circuit 20, the oscillation frequency of the synthesizer 18 is locked to that of the control channel (step 222) and the receiver 14 is turned ON (step 223) to receive electromagnetic waves through the control channel (C-CH). And the strength of electric field of radio waves received through the control channel is detected by the received-field detector 19 in the form of a detection signal. When the intensity of the received field does not reach a predetermined level (step 224), the control circuit judges that the control channel is idle, and turns ON the transmitter 17 (step 225) to generate therefrom a calling signal including its own allocated ID code (step 226).

The base unit 1, on the other hand, is monitoring the presence and absence of radio waves received through the control channel. When the base unit 1 detects at the received-field detecting circuit 10 that the received electric field is below E1 (step 121) and the base unit receives the calling signal from the radio telephone set 2 (step 122), the base unit checks whether or not the ID code of the received calling signal coincides with the ID code allocated to the combination between the base unit and the calling radio telephone set 2 (step 123). If the base unit 1 determines an ID code coincidence therebetween, then the base unit 1 turns ON the transmitter 5 (step 124) and transmits a its answering signal (including the ID code and S-CH specification data) (step 125).

The radio telephone set 2 receives the answering signal from the base unit 1 through the control channel (step 227) and checks whether or not the ID code included in the received answering signal coincides with the own ID code of the radio telephone set 2 (step 228). If the radio telephone set 2 determines a coincidence, then the telephone set causes the oscillation frequency of the synthesizer 18 to be switched to the frequency of the speech channel specified by the base unit 1 (step 229). The base unit 1 itself, after transmitting the answering signal, also causes the synthesizer 9 to be switched to the specified speech channel frequency (step 126). This causes the base unit 1 and the radio telephone set 2 to be coupled each other through the speech channel specified by the base unit 1, so that the system can thereafter call the party telephone set connected at the other end of the wired telephone line 3 through user's dialing operation of the dial unit 22 (steps 230 and 127) to be put in the speech mode.

The base unit 1 and the radio telephone set 2, after switching to the speech channel in this way, checks, on the basis of the intensity of the received electric field, whethr or not the speech channel is in use. If the speech channel is judged to be not in use, then the transmitters 5 and 17 are turned ON to put the system in the speech mode. If the received electric field is kept at a level beyond the predetermined value for a time period exceeding a predetermined value, then the system judges that the speech channel is already being used and, a soon as the time-out condition is satisfied, the system is returned to the await mode.

Explanation will then made as to the operation of the radio telephone set 2 and base unit 1 when the selection switch 26 is set at a mode in which the hook operation is made by the detection switch 24.

In FIGS. 7 and 8, the selection switch 26 is set at a mode in which the hook operation is made by the detection switch 24, that is, the selection switch 26 is in its ON state (step 131). Under this condition, when the user picks up the radio telephone set 2 from the telephone-set receiving part 1A of the base unit 1 to turn OFF the detection switch 24 (step 132), the control circuit 11 judges, on the basis of the turned OFF detection switch 26, that the base unit 1 should be shifted to the calling mode. Accordingly, the oscillation frequency of the synthesizer 9 is set at the frequency of the control channel (step 133), and the transmitter 5 is turned ON (step 134) to transmit a switch off signal (including the ID code and S-CH specification data) to the radio telephone set 2 (step 135).

In the side of the radio telephone set 2, on the other hand, the synthesizer 18 and the transmitter 14 are turned ON for the predetermined time t1 and then turned OFF for the predetermined time t2 thereafter, which operation is repeated (intermittent reception operation) (steps 201, 202, 203, 231, 205, 206, 208 and 209). Under this condition, if the radio telephone set 2 receives the switch off signal (step 231) and finds an ID code coincidence (step 232), then the telephone set causes the transmitter 17 to be turned ON (step 233) to transmit a calling answer signal including its own allocated ID code) (step 234). Thereafter, the radio telephone set 2 controls the synthesizer 18 in such a manner that the oscillation frequency of the synthesizer is switched to the frequency of the speech channel specified by the base unit 1 (step 235).

The base unit 1, when receiving the calling answer signal from the radio telephone set 2 (step 136), checks whether or not the ID code of the calling answer signal coincides with the ID code allocated to the combination between the base unit 1 and the calling telephone set 2 (step 137). When the base unit 1 finds an ID code coincidence, the oscillation frequency of the synthesizer 9 is switched to the specified speech channel frequency (step 138). This enables the interconnection between the base unit 1 and radio telephone set 2 through the speech channel spedificed by the base unit 1 and thereafter enables the radio telephone set 2 to call and talk with the party telephone connected at the other end of the wired telephone line 3 through user's dialing operation of the dial unit 22 (steps 236 and 139) in the speech mode.

The speech can be terminated in the similar manner to in the foregoing called and calling modes.

In the speech-end mode, however, if another person standing by the base unit 1 erroneously operates the detection switch 24 during user's conversation with the party at a location far away from the base unit 1, this causes the line to be undesirably cut off broken against user's intention. To avoid this, the present embodiment is arranged so that, when the intensity of electric field detected by the field intensity detector 25 is above a predetermined level, the system considers it to be in such a state that the speaker at the radio telephone set 2 is talking in the vicinity of the base unit 1, only under which condition the detection state of the detection switch 24 causes the system to regard it as a speech end and to break the line. The operation of the base unit 1 and radio telephone set 2 under such conditions is shown by a flowchart in FIGS. 9 and 10.

Figure 9:
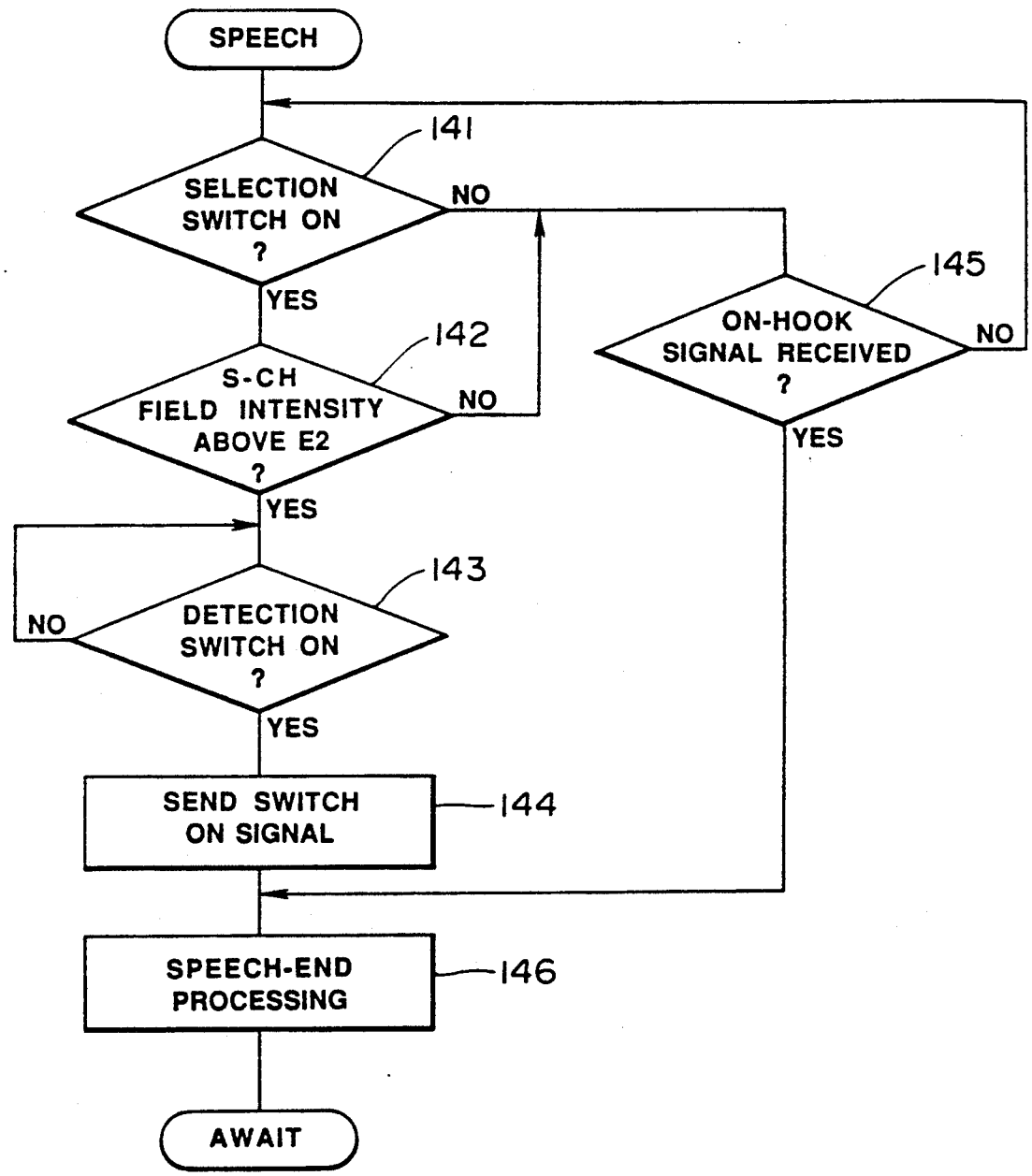
FIGS. 9 and 10 show flowcharts for explaining the operation of the base unit and radio telephone set in a speed-end mode.
Figure 10:
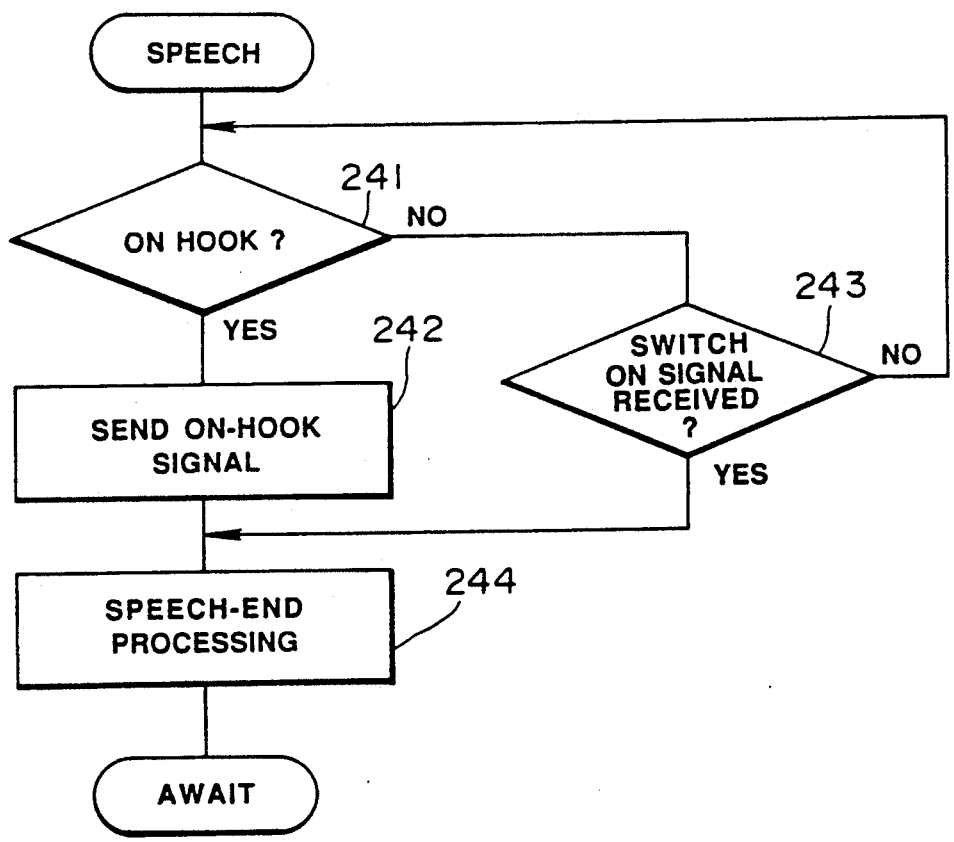

In FIGS. 9 and 10, it is assumed that the base unit 1 and the radio telephone set 2 are in the speech mode. Under this condition, the selection switch 26 is set at a mode in which the hook operation is made by the detection switch 24, i.e., the selection switch 26 is in the ON state (step 141); the field intensity detected by the field intensity detector 25 is above the value E2, i.e., the radio telephone set 2 is located near the base unit 1 (step 142); and the control circuit 11 of the base unit monitors the output of the detection switch 24. Under such a condition, if the detection switch 24 is turned ON (step 143), then the base unit 1 transmits the switch on signal (step 144), executes predetermined speech-end processing (step 146), and returns to the await mode.

When the field intensity detected by the field detector 25 does not reach the level E2 and the system judges that the radio telephone set 2 is located far away from the base unit 1 (step 142), however, the control circuit 11 of the base unit monitors the reception of the on-hook signal based on the operation of not the detection switch 24 but of the hook switch 23 of the radio telephone set 2. If the base unit 1 received the off-hook signal from the radio telephone set 2 (step 145), then the base unit executes the predetermined speech-end processing (step 146) and returns to the await mode.

When the selection switch 26 is set at a mode in which the hook operation is made by the hook switch 23, that is, when the selection switch 26 is in the OFF state (step 141), the control circuit 11 of the base unit monitors the reception of the on-hook signal based on the operation of the hook switch 23 of the radio telephone set 2. If the base unit receives the off-hook signal from the radio telephone set 2 (step 145), it executes the predetermined speech-end processing (step 146) and returns to the await mode.

Meanwhile, the radio telephone set 2 monitors the on-hook operation of the hook switch 23. If the radio telephone set 2 detects the on-hook operation (step 241), it transmits the on-hook signal (step 242), executes predetermined speech-end processing (step 244) and returns to the await mode. The radio telephone set 2 also monitors the reception of the switch on signal sent from the base unit 1. When the radio telephone set 2 the switch on signal from the base unit 1 (step 243), the telephone set similarly executes the predetermined speech-end processing (step 244) and returns to the await mode.

The present embodiment is arranged so that, under such a condition that the selection switch 26 is set at at a mode in which the hook operation is made by the hook switch 23, the detection switch 24 is in the non-detection state and the field strength detected by the field intensity detector 25 is below the predetermined level (that is, when the radio telephone set 2 is located far away from the base unit 1); the setting of the detection switch 24 in the detection state for a short time (for example, 1-2 seconds) will cause the base unit 1 to transmit a ringing signal to the radio telephone set 2. The aforementioned operation of the base unit 1 and radio telephone set 2 is shown by a flowchart in FIGS. 11 and 12.

Figure 11:
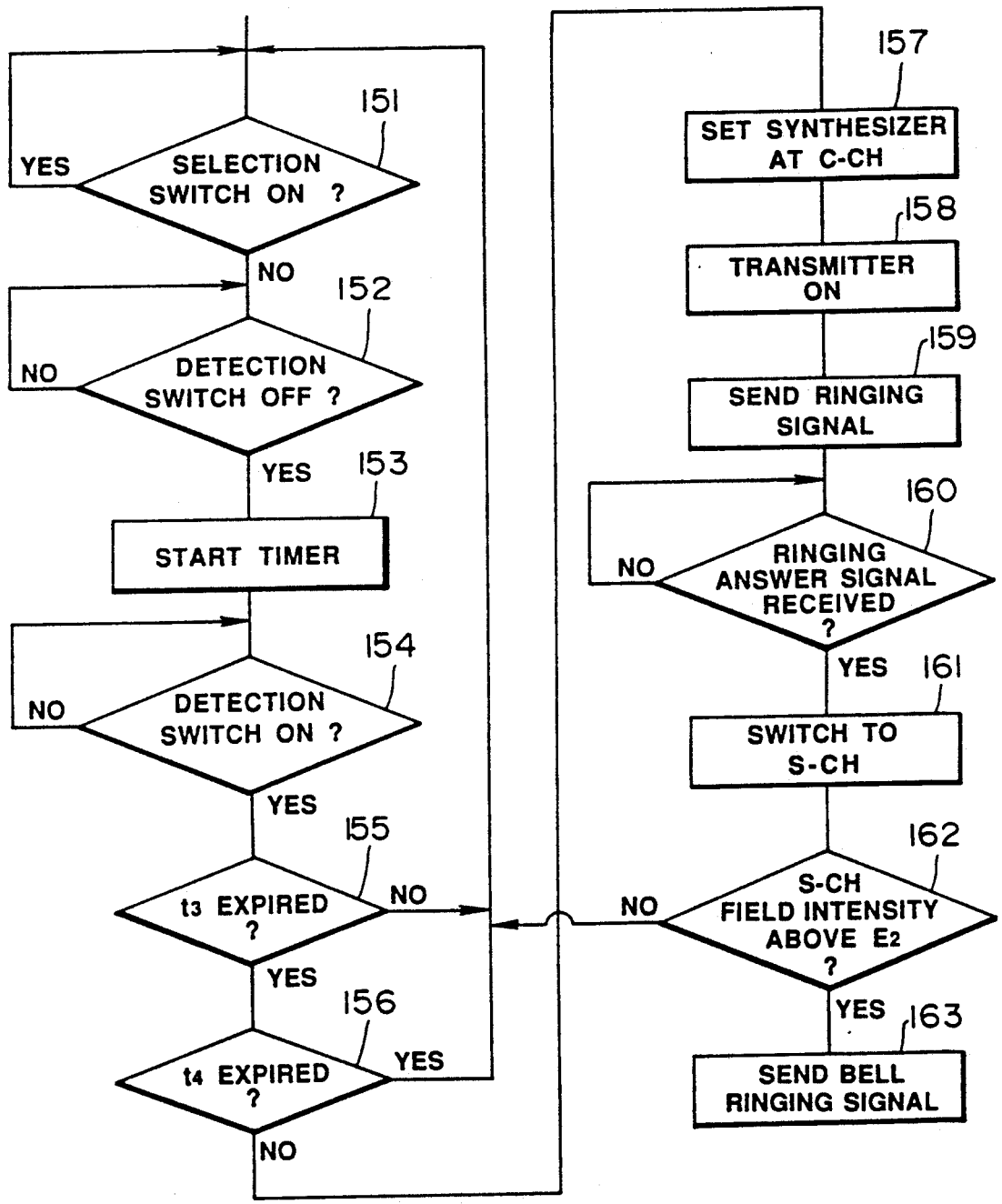
FIGS. 11 and 12 show flowcharts for explaining the operation of the base unit and radio telephone set when a calling is effected with use of the detection switch.
Figure 12:
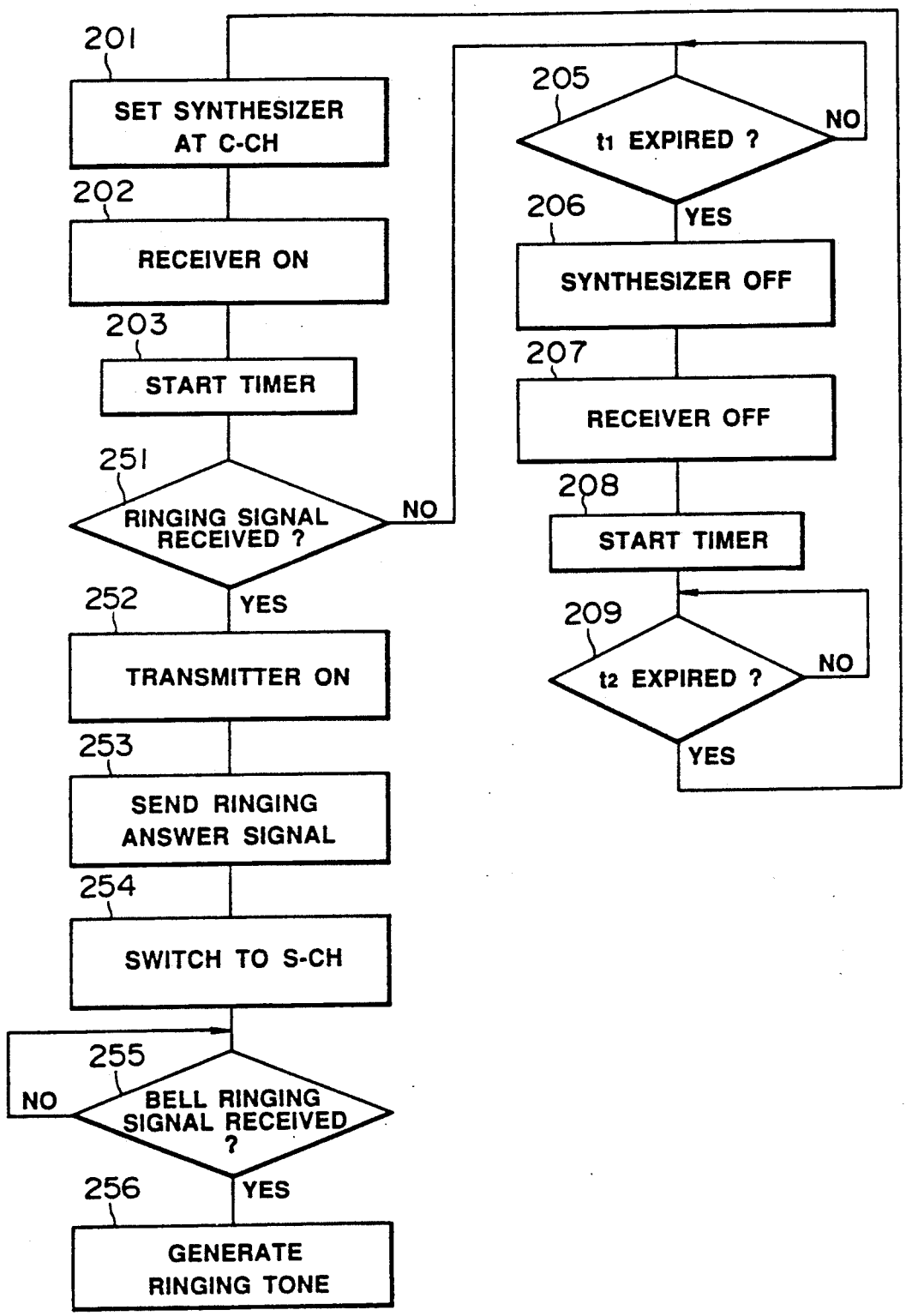

In FIGS. 11 and 12, under a condition wherein the selection switch 26 is set at a mode in which the hook operation is made by the hook switch 23 (step 151), if the detection switch 24 is turned OFF (step 152) then the control circuit 11 of the base unit 1 starts the timer (step 153). Subsequently, when the control circuit, which also monitors the turning ON of the detection switch 24 (step 154), the turning ON of the detection switch 24 during a time from a time t3 to a time 4 (steps 155 and 156), the control circuit will cause the synthesizer 9 to be set at the control channel C-CH (step 157) and also cause the transmiter 5 to be turned ON (step 158), whereby the base unit 1 transmits the ringing signal to the radio telephoneset 2 (step 159).

In the radio telephone set 2, on the other hand, the synthesizer 18 and the transmitter 14 are turned ON for the predetermined time t1 and then turned OFF for the predetermined time t2 thereafter, which is repeated (intermittent signal reception operation) (steps 201, 202, 203, 251, 205, 206, 208 and 209). Under this condition, if the radio telephone set 2 receives the ringing signal from the base unit 1 (step 251), then the transmitter 17 is turned ON (step 252) to transmit the calling answer signal (step 233) and the oscillation frequency of the synthesizer 18 is switched to the frequency of the speech channel specified by the base unit 1 (step 254).

The reception of the calling answer signal at the base unit 1 from the radio telephone set (step 160) causes the switching of the speech channel S-CH to an idle speech channel (step 161). And when the field strength detected by the field detector 25 is below the predetermined level, that is, when the radio telephone set 2 is located too much away from the base unit 1 (step 162), the base unit transmits the bell ringing signal to the radio telephone set 2 (step 163).

The reception of the bell ringing signal at the radio telephone set from the base unit 1 causes the loudspeaker 21 to be driven to generate a ringing tone (step 256). This enables the base unit 1 to directly call the user of the radio telephone set 2 located far away from the base unit 1.

Although the ringing tone is the same as the ringing tone in the case of the incoming signal received from the wired telephone line 3 in the present embodiment, the former ringing tone may be made different as a unique one from the latter in tone quality, sound volume, pitch and generating form, if necessary.

The ringing tone has been generated after the switching of the speech channel C-CH in the foregoing embodiment, but the generation of the ringing tone may be made in the control channel C-CH state.

In this connection, the ringing tone can be stopped in response to the operation of the hook switch 23 of the radio telephone set 2.

The system has been shifted to the speech-end by the detection output of the detection switch 24 only when the intensity of electric field exceeds the predetermined value, but it may be shifted to the speech-end mode independently of the field intensity.

In addition, the system may be shifted to the speech-end mode when the detection switch 24 is kept at the detection state for more than a predetermined time.

This usage of detection switch can be utilized to locate a radio telephone set in the event that a user lose sight of the radio telephone set, too.

Further, the detection switch 24 is not restricted to a mechanical switch and it may be an electrical switch or an optical switch which electrically or optically detects the state of the radio telephone-set mounted in or dismounted from the telephone-set receiving part of the base unit to realize the same arrangement as the above.

Though the detection switch 24 for detecting the mounted or dismounted state of the radio telephoen set with respect to the telephone-set receiving part of the base unit has been provided in the base unit, the switch may be provided in the radio telephone set. In the latter case, a selection switch may be provided in the radio telephone set for selecting whether the on-hook and off-hook operations of the radio telephone set are to be carried out by the hook switch of the radio telephone set or by mounting or dismounting the radio telephone set in or from the telephone-set receiving part of the base unit.

In addition, detection switchs for detecting the mounted or dismounted state of the radio telephone set with respect to the telephone-set receiving part of the base unit may be provided in both the base unit and the radio telephone set.

Such an arrangement is shown in FIG. 13 as another embodiment of the present invention. In the present embodiment, a first detection switch 24' is provided in the base unit 1 as means for detecting the mounted or dismounted state of the radio telephone set with respect to the telephone-set receiving part of the base unit, while a second detection switch 29 is provided in the radio telephone set 2. A sounder 28 is provided in the base unit. The sounder 28 can be driven with a power supplied from the office through the wired line 3. The ON and OFF operations of a power supply 27 of the base unit 1 are controlled by an output of the first detection switch 24, whereas the ON and OFF operations of a power supply 30 of the radio telephone set 2 are controlled by an output of the second detection switch 29.

More specifically, in the present embodiment, when the radio telephone set 21 is placed in the telephone-set receiving part of the base unit 1 so that the first and second detection switches 24' and 29 are both turned ON, the power supply 27 of the base unit 1 is turned OFF by the output of the first detection switch 24' and the power supply 30 of the radio telephone set 2 is turned OFF by the output of the second detection switch 29. Under such a condition, if the base unit 1 receives an incoming call from the wired line 3, then the sounder 28 may be operated with power supplied via the wired line 3 and sounded. Responsive to the sounding, if the operator picks up the radio telephone set 2 from the telephone-set receiving part of the base unit 1, this causes the first and second detection switch 24' and 29 to be both turned OFF, whereby the power supplies 27 and 30 of the base unit 1 and radio telephone set 2 are both turned ON. Thereafter, a spatial radio communication link may beestablished between the base unit 1 and the radio telephone set 2.

When it is desired to originate a call at the radio telephone set 2, the operator first picks up the radio telephone set 2 from the telephone-set receiving part of the base unit 1 to turn ON both the power supplies 27 and 30 of the base unit 1 and radio telephone set 2. After this, a spatial radio communication link is established between the base unit 1 and the radio telephone set 2 to form a speech loop.

With such an arrangement, so long as the radio telephone set 2 is put in the telephone-set receiving part of the base unit 1, that is, the system is in the await mode, the power supplies 27 and 30 of the base unit 1 and radio telephone set 2 are both in the OFF state, for which reason the power consumption of the system can be reduced to a large extent. The power supply 27 of the base unit 1 may be, for example, a commercial power source, while the power supply 30 of the radio telephone set 2 may be a dry cell or a chargeable battery.

The operation of the present embodiment will be explained by referring to flowcharts shown in FIGS. 14 to 19, in which parts having the same functions as those in the flowcharts of FIGS. 3 to 12 are denoted by the same reference numerals for the convenience of explanation.

FIG. 14 shows the operation of the base unit 1 in the event that an incoming call is received. When the base unit 1 receives an incoming call from the wired line 3 (step 101), it judges whether the selection switch 24 is in the ON state (step 172). In the event that the selection switch 26 is in the OFF state, that is, the mode in which the hook switch provided at the radio telephone set 2 causes the on-hook or off-hook operation is selected, then the power supply 27 of the base unit 1 is turned ON (step 122). The subsequent operation is the same as in FIG. 3.

When the selection switch 26 is in the ON state, that is, when such a mode is set that the on-hook and off-hook operations are to be carried out by the mounting or dismounting the telephone 2 in or from the telephone receiving part of the base unit 1, the incoming call causes the sounder 28 to be rung (step 173). The ringing of the sounder 28 is powered by office power supplied from the wired line 3.

When the operator picks up the radio telephone set 2 from the telephone receiving part of the base unit 1 in response to the ringing of the sounder 28 to turn OFF the first detection switch 24' (step 174), this causes the generation of the ringing tone from the sounder 28 to be stopped (step 175), turning ON the power supply 27 (step 176). Thereafter, the frequency of the synthesizer 9 is set at the C-CH (step 177), the transmiter 5 is turned ON (step 178), an S-CH specification signal (including its ID code) indicative of an idle S-CH is transmitted (step 179), and the frequency of the synthesizer 9 is switched to the S-CH specified by this S-CH specification signal (step 180). Thereafter, a speech loop is established (step 120) to put the system in the speech mode.

Shown in FIG. 15 is the operation of the radio telephone set 2 in the incoming-call mode. The telephone set 2 first judges whether the selection switch 29 is in ON state (step 261). In this embodiment, the selection switch 31 corresponds to a power switch of the radio telephone set 2'. In the event that the selection switch 31 is in the OFF state (corresponding to an ON state of the power switch), the radio telephone set 2 is put into an operational state wherein usual intermittent receiving operations for detecting an incoming signal from the base unit 1' is performed as mentioned above (steps 201 to 217) after once powered entirely (step 262).

Conversely, in the event that the selection switch 31 is in the ON state (corresponding to an OFF state of the power switch), the radio telephone set 2' isn't supplied power at all. If the radio telephone set 2' is picked up from the telephone receiving part of the base unit 1' in response to the ringing of the sounder 28 in the base unit 1', the second detection switch 29 is activated (step 263). Responsive to the activation of the second detection switch 29, the radio telephone set 2' is entirely powered by a power supply 30 (step 2630). Powered by the power supply 30, the controller 20' waits to receive a S-CH designation signal with an ID code, which is transmitted from the base unit 1' (step 264). Upon a reception of the S-CH designation signal with the ID code, the controller 20' checks whether the received ID code coincides with its own one (step 265). The determination of an ID code coincidence causes the frequency of the synthesizer 18 to be set at the S-CH specified by the S-CH designation signal to switch to the S-CH (step 266), after which the system is put in the speech mode.

Figure 16:
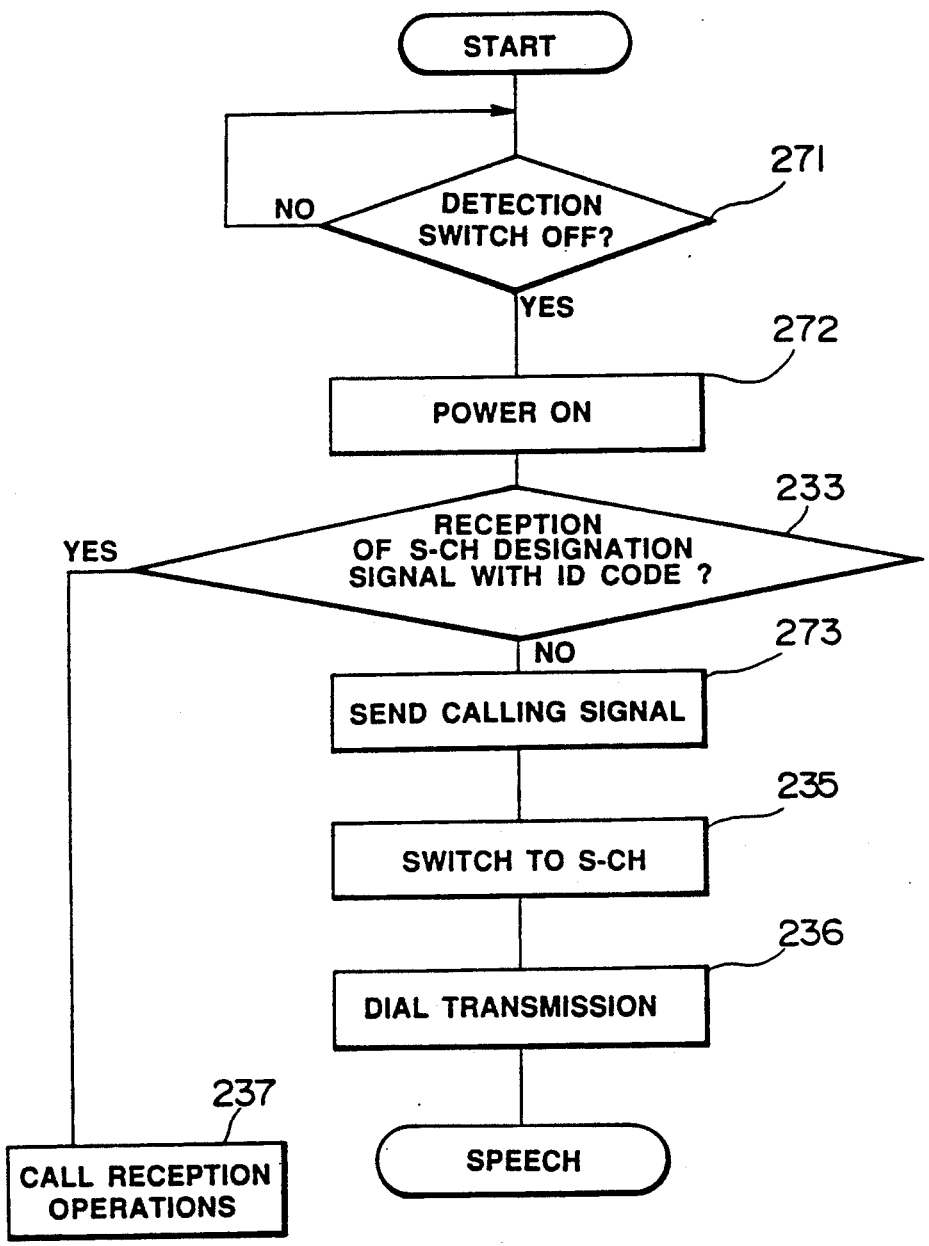
FIGS. 16 and 17 are flowcharts of the operations of the radio telephone set 2 and base unit 1 in the calling mode in which a selection switch is in the ON state and the mounting or dismounting operation of the radio telephone set 2 from a telephone-set receiving part of the base unit 1 allows the off-hook or on-hook operation.
Figure 17:
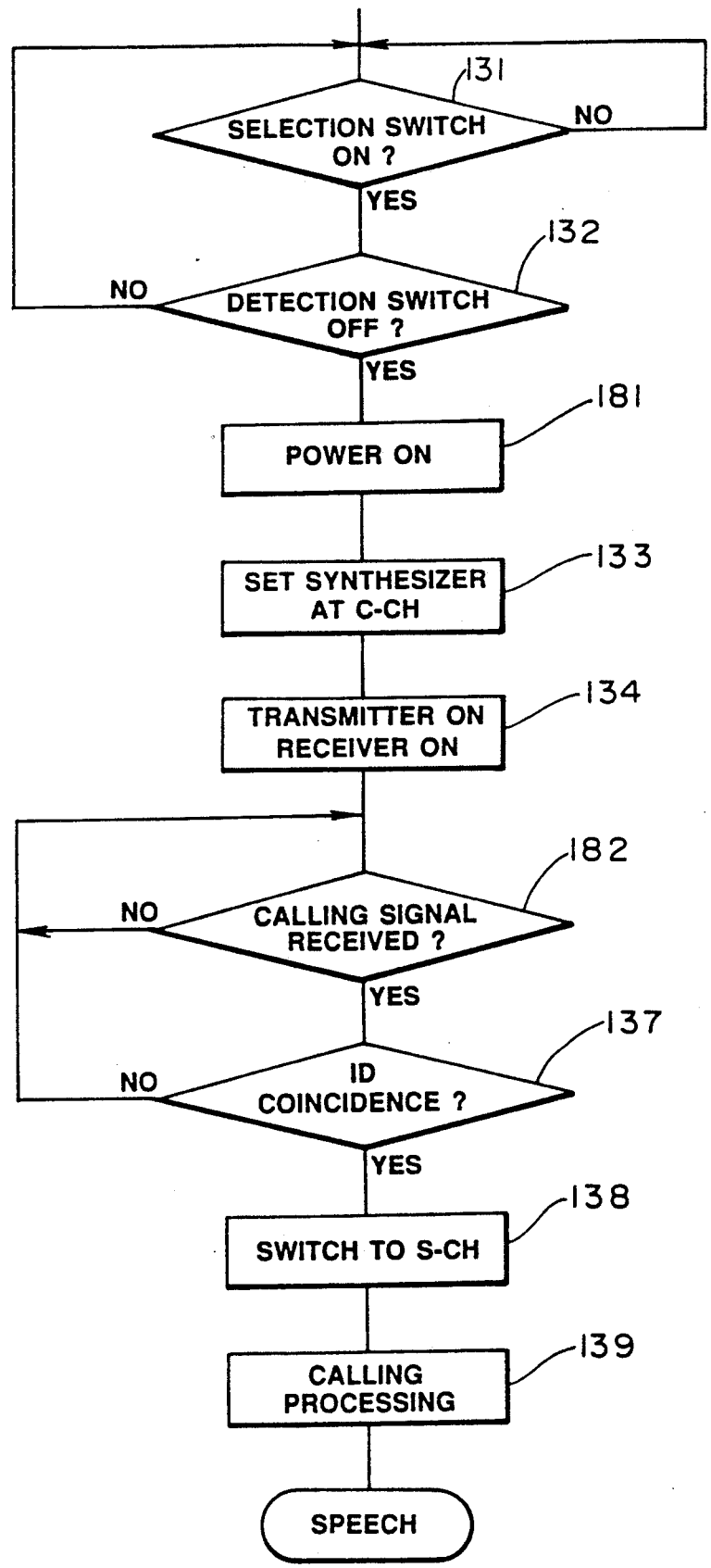

FIGS. 16 and 17 show flowcharts of the operations of the radio telephone set 2' and base unit 1' in the event that a call is originated from the system and the selection switches 26, 31 of the base unit 1' and the radio telephone set 2' are selected to the ON sate. It should be noted that the operations of the system in the event that the selection switches 26, 31 are selected to the OFF state is the same as shown in FIGS. 5 and 6. The radio telephone set 2' is normally placed in the telephone receiving part of the base unit 1' and the radio telephone set 2' is not supplied power by the power supply 30. Under such a condition, if the operators picks up the radio telephone set 2' from the telephone receiving part of the base unit 1 to activate the second detection switch 29 (step 271), then this causes the power supply 30 to be turned ON (step 272). Subsequently, the radio telephone set 2' is entirely supplied power by the power suply 30. Then, controller 20' checks whether S-CH designation signal with an ID code is received within subsequent predetermined time period (step 233). If it is received, the controller 20' determines that the operator picked up the radio telephone set 2' to respond an incoming call and proceeds to a call reception operations such as step 267 of FIG. 15 (step 237). If it isn't received, the transmitter 17 is controlled so that the transmitter transmits a calling signal including an S-CH designation signal indicative of an idle channel and including its own ID code (step 273).

The base unit 1', on the other hand, when the first detection switch 24' is activated in response to the removal of the radio telephone set 2' from the base unit 1' (step 132), causes the power supply 27 to be turned ON (step 181) so that the transmitter 5 and the receiver 8 are turned ON (step 134). Under such a condition, when the base unit 1 receives the calling signal from the radio telephone set 2 (step 182) and finds a coincidence between its own ID code and the ID code of the received calling signal (step 137), this causes the frequency of the synthesizer 9 to be switched to the S-CH specified by the S-CH designation signal included in the received calling signal (step 138).

After transmitting the calling signal, the radio telephone set 2' causes the frequency of the synthesizer 18 to be switched to the S-CH designated by the channel designation signal included in the calling signal (step 235), thus performing the dial transmission based on predetermined dialing operation (step 236). In this event, dial numbers input by a user may be stored in a register or memory temporarily. This is because it may take a moment to establish a radio link between the base unit 1' and the radio telephone set 2'.

In response to the dial transmission, the base unit 1' performs predetermined calling processing (step 139), after which the radio telephone set 2' is put in the speech state through the base unit 1 with the party. Thereby, a communication link may be established between the radio telephone set and the called party.

Figure 18:
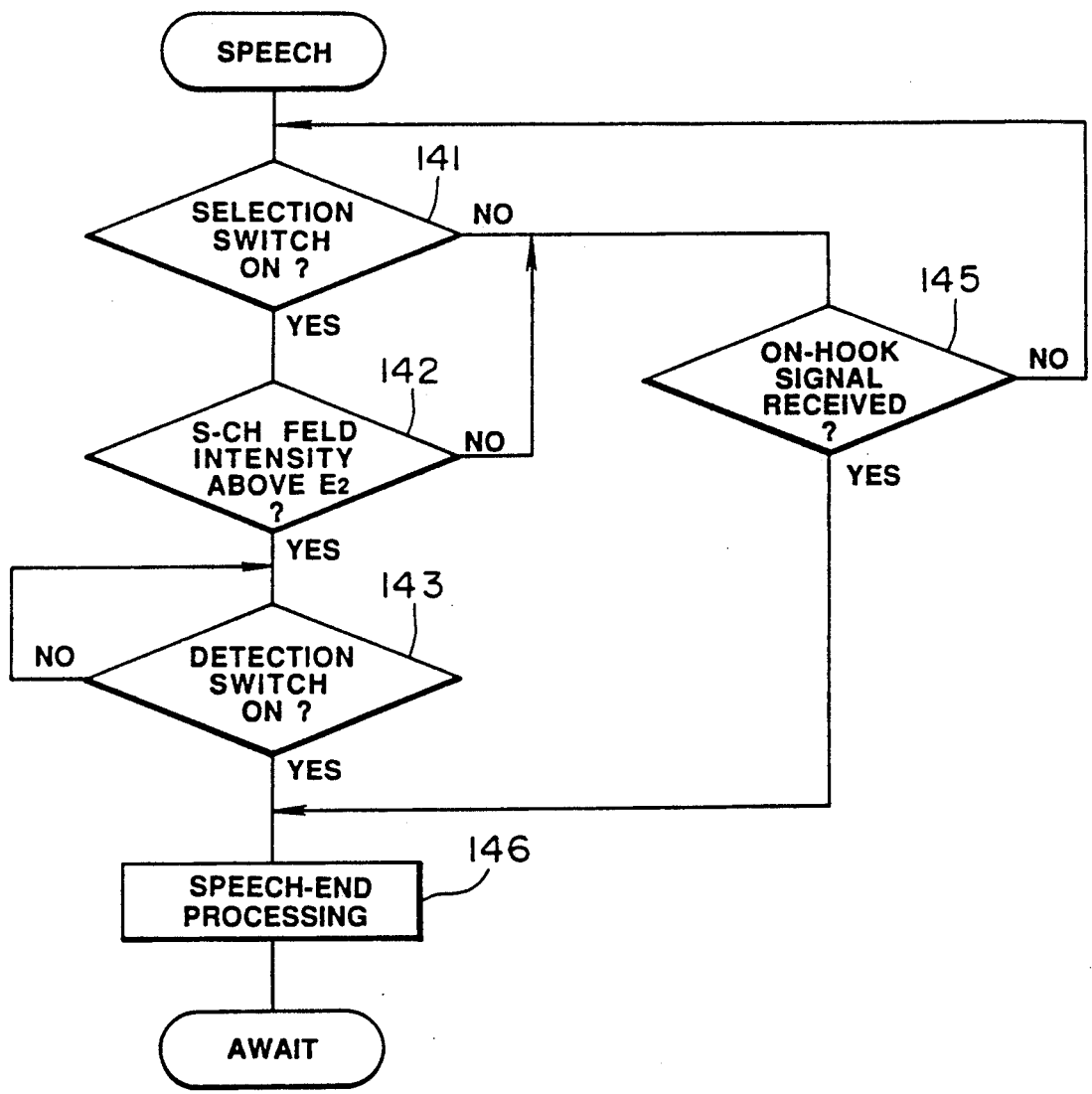
FIGS. 18 and 19 are flowcharts of the operations of the base unit 1 and radio telephone set 2 in the speech-end mode.
Figure 19:
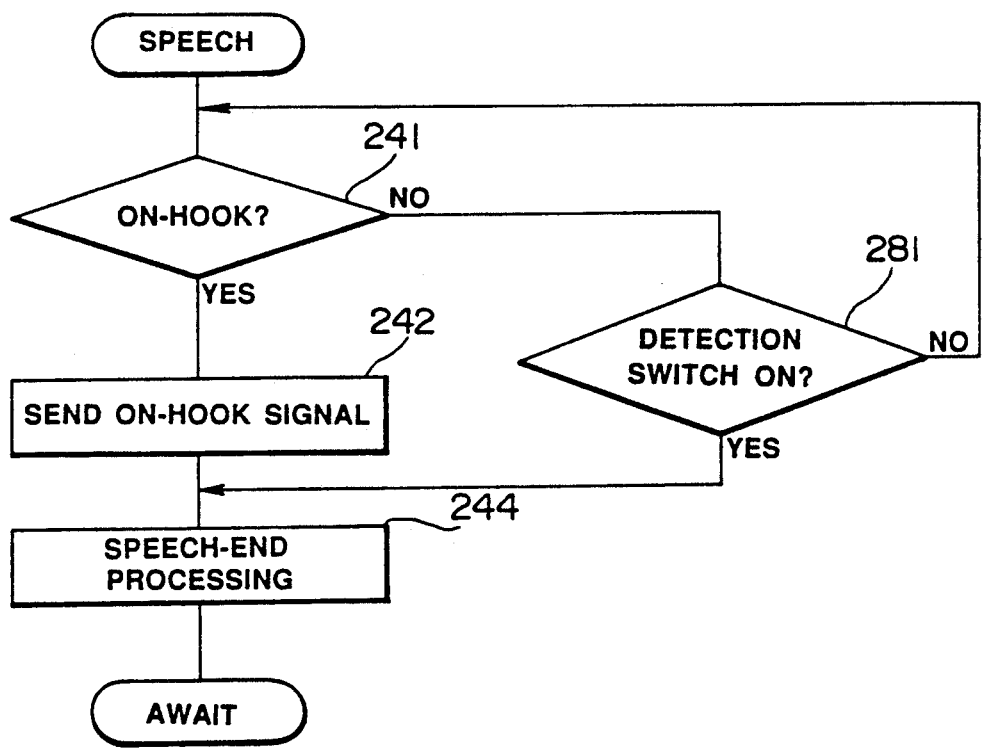

FIGS. 18 and 19 show flowcharts of the operations of the base unit 1 and radio telephone set 2' when speech communication link is disconnected. In the present embodiment, since the second switch 29 for detecting the mounted or dismounted state of the telephone 2' in or from the telephone receiving part of the base unit 1' is provided also in the radio telephone set 2', a switch-ON signal indicative of turned-ON first switch is not transmitted in the flowchart of FIG. 18. In other words, the flowchart of FIG. 18 corresponds to the flowchart of FIG. 9 with the step 144 removed. The other operation is substantially the same as that of FIG. 9.

Similarly, in FIG. 19, a step of checking whether or not the second detection switch 29 is in the ON state corresponds to the step 243 in FIG. 10. Other operation is substantially the same as that of FIG. 10.

It is to be appreciated that the detection switch 24 for detecting the mounted or dismounted state of the telephone 2' with respect to the telephone receiving part of the base unit 1, the first detection switch 24' and the second detection switch 29 may be modified in various forms, so long as these switches can detect a state indicative of a predetermined positional relationship between the base unit 1' and telephone 2' as well as a state indicative of out-of-such-relationship.

What is claimed is:

1. A radio telephone system, comprising:
    a base unit connected to a wired line;
    a radio telephone set connected through a spatial radio circuit to said base unit;
    detecting means for detecting whether or not said radio telephone set is mounted on a telephone-set receiving part provided in said base unit;
    control means for controlling connection and disconnection between said wired line and said radio telephone set through said spatial radio circuit on the basis of an output of said detecting means; and
    wherein said detecting means comprises switching means which is turned ON and OFF when said radio telephone set is mounted on and dismounted from said telephone-set receiving part of said base unit, respectively.

2. A radio telephone system, comprising:

a base unit connected to a wired line;

a radio telephone set connected through a spatial radio circuit to said base unit;

detecting means for detecting whether or not said radio telephone set is mounted on a telephone-set receiving part provided in said base unit;

selection means for determining that on-hook and off-hook operations of said radio telephone set are carried out by a hook switch of said radio telephone set or by an output of said detecting means;

means for controlling connection and disconnection between said wired line and said radio telephone set through said spatial radio circuit on the basis of on/off signals of said hook switch when said selection means is set to select the on-hook and off-hook operations by said hook switch of said radio telephone set, and for controlling the connection and disconnection between said wired line and said radio telephone set through said spatial radio circuit on the basis of the output of said detecting means when said selection means is set to select the on-hook and off-hook operations by the output of said detecting means; and wherein said detecting means comprises switching means which is turned ON and OFF when said radio telephone set is mounted on and dismounted from said telephone-set receiving part of said base unit, respectively.

3. A base unit for use in a cordless or radio telephone system wherein a mobile unit is normally disposed in a predetermined positional relationship with said base unit connected to a subscriber line, said mobile unit broadcasting a control signal for radio link establishment between said base unit and said mobile unit over at least a radio channel, said base unit comprising:

detecting means for detecting a change of the predetermined relationship;

signal detecting means for receiving signals transmitted over the radio channel and detecting said control signal within the received signals;

control means coupled to said detecting means for controlling said signal detecting means so that the operation of said signal detecting means is initiated in response to the detection of a change of the predetermined positional relationship; and power supply means coupled to said detecting means for supplying power to said signal detecting means in response to the detection of a change of the predetermined relationship.

4. A base unit for use in a cordless or radio telephone system wherein a mobile unit is normally disposed in a predetermined positional relationship with said base unit connected to a subscriber line, said mobile unit broadcasting a control signal for radio link establishment between said base unit and said mobile unit over at least a radio channel, said base unit comprising:

detecting means for detecting a change of the predetermined relationship;

signal detecting means for receiving signals transmitted over the radio channel and detecting said control signal within the received signals;

control means coupled to said detecting means for controlling said signal detecting means so that the operation of said signal detecting means is initiated in response to the detection of a change of the predetermined positional relationship; and transmitting means coupled to said detecting means for transitting a response signal responding to said control signal and wherein said transmitting means is powered in response to the detection of a change of the predetermined positional relationship.

5. A base unit for use in a cordless or radio telephone system wherein a mobile unit is normally disposed in a predetermined positional relationship with said base unit connected to a subscriber line, said mobile unit broadcasting a control signal for radio link establishment between said base unit and said mobile unit over at least a radio channel, said base unit comprising:

detecting means for detecting a change of the predetermined relationship;

signal detecting means for receiving signals transmitted over the radio channel and detecting said control signal within the received signals;

control means coupled to said detecting means for controlling said signal detecting means so that the operation of said signal detecting means is initiated in response to the detection of a change of the predetermined positional relationship; and switching means and wherein said detecting means detects the change of the predetermined positional relationship by a switching operation of said switching means.

* * * * *